(12) United States Patent
Chou

(10) Patent No.: US 10,610,336 B2
(45) Date of Patent: Apr. 7, 2020

(54) TRAY APPLIANCE SYSTEM FOR MAKING A DENTAL PROSTHESIS

(71) Applicant: Jang-Ching Chou, Overland Park, KS (US)

(72) Inventor: Jang-Ching Chou, Overland Park, KS (US)

( * ) Notice: Subject to any disclaimer, the term of this patent is extended or adjusted under 35 U.S.C. 154(b) by 0 days.

(21) Appl. No.: 16/080,322

(22) PCT Filed: May 19, 2018

(86) PCT No.: PCT/US2018/033558
§ 371 (c)(1),
(2) Date: Aug. 28, 2018

(87) PCT Pub. No.: WO2018/222419
PCT Pub. Date: Dec. 6, 2018

(65) Prior Publication Data
US 2019/0358000 A1    Nov. 28, 2019

Related U.S. Application Data

(60) Provisional application No. 62/512,075, filed on May 29, 2017.

(51) Int. Cl.
| | | |
|---|---|---|
| *A61C 9/00* | (2006.01) | |
| *A61C 13/097* | (2006.01) | |
| *A61C 19/05* | (2006.01) | |
| *A61C 13/01* | (2006.01) | |
| *A61C 13/00* | (2006.01) | |
| *A61C 13/34* | (2006.01) | |

(52) U.S. Cl.
CPC ............ *A61C 9/0006* (2013.01); *A61C 13/01* (2013.01); *A61C 13/097* (2013.01); *A61C 19/05* (2013.01); *A61C 13/0004* (2013.01); *A61C 13/34* (2013.01)

(58) Field of Classification Search
CPC ......... A61C 9/00; A61C 9/0006; A61C 19/05; A61C 13/00–34; A61C 5/007–30; A61C 5/70–77
See application file for complete search history.

(56) References Cited

U.S. PATENT DOCUMENTS

| | | | |
|---|---|---|---|
| 2,183,512 A | 11/1936 | Brenner | |
| 2,129,040 A * | 9/1938 | Sears | A61C 13/097 433/197 |
| 2,341,155 A | 2/1944 | Myerson | |

(Continued)

OTHER PUBLICATIONS

USPTO as International Search Authority, International Search Report and Written Opinion (ISR/WO), PCT/US18/33558, dated Aug. 10, 2018, Alexandria, Virginia, USA.

*Primary Examiner* — Edward Moran
(74) *Attorney, Agent, or Firm* — Louis Ventre, Jr.

(57) ABSTRACT

A dental tray appliance system including a maxillary tray appliance and optionally a mandibular tray appliance. The maxillary tray appliance includes a first base portion, a first premolar tooth form, optionally a first contacting portion, optionally a contralateral first premolar tooth form, and optionally a central incisor tooth form. Each premolar tooth form has no lingual cusp as part of improvements in occlusal registration components. The mandibular tray appliance includes a second base portion, optionally a second contacting portion; and optionally a second bite material accepting portion.

2 Claims, 15 Drawing Sheets

(56) References Cited

U.S. PATENT DOCUMENTS

| | | | |
|---|---|---|---|
| 2,582,104 | A | 1/1952 | Coble |
| 3,316,639 | A | 5/1967 | Shovers |
| 4,245,988 | A | 1/1981 | Cinotti et al. |
| 4,259,074 | A * | 3/1981 | Link .................. A61C 13/00 433/214 |
| 4,345,900 | A | 8/1982 | Katz et al. |
| 4,657,509 | A * | 4/1987 | Morris ............... A61C 9/0006 433/171 |
| 5,092,022 | A | 3/1992 | Duret |
| 6,315,555 | B1 | 11/2001 | Bortolotti |
| 2003/0162147 | A1 | 8/2003 | Dequeker |
| 2005/0196724 | A1 | 9/2005 | Miller et al. |
| 2007/0231774 | A1 | 10/2007 | Massad |
| 2009/0246729 | A1 | 10/2009 | Massad |
| 2015/0147719 | A1 | 5/2015 | Wallace |
| 2015/0190216 | A1 | 7/2015 | Suga et al. |

* cited by examiner

TRAY APPLIANCE SYSTEM FOR MAKING A DENTAL PROSTHESIS

CROSS-REFERENCE TO RELATED APPLICATIONS

This application is a National Stage entry from PCT application PCT/US18/33558 filed 19 May 2018. This application claims the benefit of U.S. Provisional Application No. 62/512,075, filed 29 May 2017, which is hereby incorporated herein in its entirety.

TECHNICAL FIELD

In the field of dentistry, an apparatus is disclosed that is useful in fabricating dental prostheses, and in dental diagnosis where it is advantageous to visualize tooth form(s) in a patient's mouth while obtaining an accurate spatial configuration of the patient's maxillary jaw in comparison to the patient's mandibular jaw, with particularly useful application to an individual that is edentulous in at least a maxillary jaw.

BACKGROUND ART

A typical individual, or patient, has both a mandible (lower jaw or jawbone) and a maxilla (upper jaw). The lower jawbone is the strongest and lowest bone in the human face and it holds the lower teeth in place. The mandible is the only movable bone in the human skull and it is positioned beneath the maxilla. The mandible rotates about a hinge axis. The mandible may also undergo translational movement, i.e. moving forward, left, right, upward, downward etc.

Traditionally, making, for example, dentures takes at least 5 appointments, and include various steps, such as obtaining impressions, fabricating wax rims, adjusting the wax rims, setting teeth, and fabricating dentures.

Other methods include use of edentulous tray systems with bite determining assemblies. One such edentulous tray system includes a pin and striking plate assembly, such as described in U.S. Pat. No. 8,070,489 to Massad. Another edentulous tray system includes projecting parts located on lateral portions of maxillary and mandibular trays, such as described in U.S. Pat. No. 9,498,310 to Suga.

SUMMARY OF INVENTION

The "Tray appliance system for making a dental prosthesis" for a patient is a maxillary tray appliance and optionally a mandibular tray appliance. The patient is a human being having a mouth defined by a maxillary jaw and a mandibular jaw.

Overall, when placed in the patient's mouth, the maxillary tray appliance is contoured to accept bite registration material, so that when the patient bites down such action enables the dental prosthesis to be made therewith. The maxillary tray appliance includes three components: a first base portion, a first contacting portion, and a first premolar tooth form.

The first base portion includes a first U-shaped portion being substantially U shaped in top view, and a first lingual portion extending upwardly with slope of at least 10 degrees from a lingual side of said first U-shaped portion.

The first contacting portion is contoured to make contact with a contacting surface originating from the mandibular jaw of the patient. Optionally, the first contacting portion is a ridge type contacting portion, a plate type contacting portion, or a pin type contacting portion.

The first premolar tooth form defines a contour with at least an incisal 2 millimeters of a facial surface of a natural or artificial premolar tooth. The first premolar tooth form defines a first premolar mesial end, a premolar bucco-lingual axis and a premolar mesio-distal axis. The first premolar tooth form is in a premolar tooth position when the maxillary tray appliance is fitted within the mouth of the patient and has no lingual cusp. Preferably, the first premolar tooth form defines a first premolar cusp tip.

Optionally, the maxillary tray appliance includes a central incisor tooth form and/or a contralateral first premolar tooth form. When present, the contralateral first premolar tooth form defines a contralateral first premolar cusp tip. An incisal end of the central incisor tooth form, the first premolar cusp tip, and the contralateral first premolar cusp tip define an incisal plane.

Optionally, the first base portion defines a first area for accepting a bite registration material surrounded by a first buccal boundary, a first mesial boundary, a first lingual boundary, and a first distal boundary. The first buccal boundary is defined as being parallel to the premolar mesio-distal axis and 3 millimeters lingual to the first premolar cusp tip. The first mesial boundary is defined as being parallel to the premolar bucco-lingual axis in bottom view, and collinear with the first premolar mesial end. The first lingual boundary is 10 millimeters lingual to the first buccal boundary and parallel to the premolar mesio-distal axis. The first distal boundary is 20 millimeters distal to the first mesial boundary and parallel to the premolar bucco-lingual axis.

Optionally, the maxillary tray appliance includes a first bite material accepting portion that is downwardly extending from the first base portion. At least a portion of the first bite material accepting portion is within the first area. Optionally, the first bite material accepting portion extends downwardly no further than the incisal plane. Alternatively, it extends downwardly no further than 1 millimeter to 5 millimeters to the incisal plane. Alternatively, it extends downwardly past the incisal plane and no further than 30 millimeters past the incisal plane.

The bite material accepting portion may be configured to: define at least one flat surface; have a block-like form in bottom view; have a multifaced form in bottom view; or have a cylindrical form in perspective view. Optionally, the first bite material accepting portion is, in part, V shaped in bottom view.

The tray appliance system optionally includes a mandibular tray appliance having a second base portion that is substantially U shaped in bottom view. The second base portion has a second lingual portion extending downwardly with slope of at least 10 degrees from a lingual side of the first U-shaped portion. The second base portion has a second contacting portion. The second base portion has a second bite material accepting portion that extends upwardly no further than the incisal plane when the tray appliance system is fitted within the mouth of the patient.

Optionally, the second bite material accepting portion has a second buccal surface that is between 2 millimeters and 10 millimeters lingual to the first premolar cusp tip when the tray appliance system is fitted within the mouth of the patient.

Optionally, the second bite material accepting portion has a second top surface that is between 1 millimeter and 5 millimeters lower than the incisal plane when the tray appliance system is fitted within the mouth of the patient.

In an alternative embodiment, the tray appliance system includes a first base portion; and a first premolar tooth form. The first base portion has a first U-shaped portion and a first lingual portion extending upwardly with slope of at least 10 degrees from a lingual side of the first U-shaped portion. The first premolar tooth form defines a contour with at least an incisal 2 millimeters of a facial surface of a natural or artificial premolar tooth. The first premolar tooth form has no lingual cusp and is in a premolar tooth position when the maxillary tray appliance is fitted within the mouth of the patient. In this embodiment, the maxillary tray appliance is contoured to accept bite registration material when the patient bites down to enable the dental prosthesis to be made therewith.

Optionally, the maxillary tray appliance is a unitary piece.

Optionally, the mandibular tray appliance is a unitary piece.

Technical Problem

It is a known problem that most bite registration materials used in dentistry have polymerization shrinkage properties. Polymerization shrinkage of the bite registration material leads to inaccuracy in the jaw registration procedure. Therefore, it would be advantageous to reduce the overall thickness in a vertical direction of the bite registration material.

It is a known problem that bite registration materials are prone to slipping off of dental trays. Therefore, it would be advantageous to provide elements which have anti-slip properties.

It is a known problem that bite registration material is often prone to breaking, such as, for example, if the bite material is too thin after being set, and/or if there are voids in the bite material. Such breaking leads to inaccuracy in the jaw registration procedure.

It is a known problem that existing devices make it difficult to gain an accurate jaw registration while simultaneously enabling the clinician and/or the patient to evaluate what teeth would look like in the mouth in anatomically suitable locations.

Absent ability to evaluate what teeth will look like in the mouth in anatomically suitable locations, the patient is subjected to multiple office visits. Visualizing tooth form(s) in the mouth is especially important when the patient is edentulous in at least the maxillary jaw. Therefore, in most current methods for making dental prostheses, there is an inherent problem associated with the need for a try-in appointment after a final impression obtaining appointment and/or a jaw relationship obtaining appointment, where tooth form(s) may be visualized in the mouth.

When the tooth form try-in appointment follows a final impression obtaining appointment, there is a risk of damaging a master cast that had been obtained by pouring the final impression. To prevent the master cast from being damaged, the tooth form(s) are attached to a base plate, and the base plate is made such that the base plate does not lock in to the master cast. In order for the base plate to not lock in to the master cast, a spacer, such as wax is usually applied to the master cast, thus creating space between the base plate and the edentulous gum of the patient. When this base plate is tried in to the patient's mouth, it does not fit well, and often is prone to being dislodged. Therefore, utilizing the base plate to obtain a spacial relationship between the maxillary jaw and mandibular jaw is prone to being inaccurate.

Additionally, dental prostheses made in a computer-aided-manufacturing process, such as milled dentures, printed dentures, and the like cannot be tried in the mouth. Therefore, there may be an additional try-in appliance that is made following the final impression obtaining appointment and/or the jaw relationship obtaining appointment. Thus, it is a problem that the process for making a computer-aided-manufacturing process made dental prosthesis is time consuming and expensive.

If the try-in appliance step is skipped in the computer-aided-manufacturing process, there would be a high risk that the dental prostheses will not be esthetic.

Additionally when a jaw relationship obtaining and tooth form try-in are conducted at the same time, such as using an apparatus described in U.S. Pat. No. 2,582,104 to Coble, a striking assembly is positioned such that the maxillary and mandibular tooth forms do not touch. Therefore, a resultant jaw registration obtained from this apparatus will have an occlusal vertical dimension that is too tall (that is, the maxillary jaw and the mandibular jaw will be too far away from each other) relative to the patient's actual occlusal vertical dimension. Thus the jaw registration will be inaccurate.

Additionally, many jaw relationship obtaining apparatuses incorporate metallic contacting portions, such as described in U.S. Pat. No. 2,582,104 to Coble. These metallic contacting portions may be heavy, and thus would cause dislodgement of the tray appliance.

Additionally, individuals have different anatomical structures, such as more bone resorption on one side of the jaw than the other, having maxillary tuberosity larger and/or smaller than the norm.

Additionally, it is difficult to visualize how dental trays are seated in the mouth, so clinicians are prone to misaligning dental trays within the mouth.

Additionally, using current methods, it takes multiple appointments to obtain a final impression, a jaw registration, and visualizing tooth forms in the mouth.

Solution to the Problem

The solution to the problem of excess bite registration material is a tray appliance that reduces the overall thickness in a vertical direction of the bite registration material as is accomplished within the first area of the disclosed maxillary tray appliance.

The solution to the problem of bite registration materials slipping off of dental trays is a tray appliance that includes elements which have anti-slip properties as is accomplished within the first area of the disclosed maxillary tray appliance.

The solution to the problem of inaccuracy in the jaw registration procedure due to voids and/or polymerization shrinkage is solved by providing a flat surface within the first area of the disclosed maxillary appliance.

The solution to the problem of inaccuracy in the jaw registration procedure due to bite registration material breaking is a tray appliance design that provides sufficient thickness (e.g. more than 1 millimeter of thickness for silicone bite registration material), decreases slippage of bite registration material, and/or reduces physical stress in handling the bite registration material after it sets.

The solution to the problem of difficulty in gaining an accurate jaw registration while simultaneously enabling the clinician and/or the patient to evaluate what teeth would look like in the mouth in anatomically suitable locations is a maxillary tray appliance that incorporates the appearance of teeth in anatomically suitable locations such that the clinician and/or the patient can evaluate what teeth would look like in the mouth while being able to perform accurate jaw registration at the same time. Preferably, this solution is a tray appliance system that incorporates multiple tooth forms, where each tooth form defines a contour with at least incisal 2 millimeters of a facial surface of a corresponding natural or artificial tooth, and each of the tooth forms are in a location correlating to a corresponding normal and naturally-formed tooth.

The solution to the problem of needing to schedule multiple office visits is a tray appliance system that eliminates the cause of this problem, namely inability to evaluate the appearance of teeth in anatomically suitable locations. The solution is a tray appliance system that permits the clinician and/or the patient to evaluate what teeth would look like in the mouth while being able to perform accurate jaw registration at the same time.

The solution to the problem of individuals having different anatomical structures and clinicians misaligning dental trays within the mouth is a tray appliance system which can accommodate rotational and/or translational difference from the norm.

The solution to the problem of jaw relationship obtaining apparatuses being too heavy is accomplished with the maxillary tray appliance being a unitary piece. The solution to the problem of jaw relationship obtaining apparatuses being too heavy is also accomplished with the mandibular tray appliance being a unitary piece.

The solution to the problem of current art producing a resultant jaw registration with an occlusal vertical dimension that is too tall (that is, the maxillary jaw and the mandibular jaw being too far away from each other) relative to the patient's actual occlusal vertical dimension is the disclosed tray appliance system incorporating a posterior tooth form having a buccal cusp but no lingual cusp. The solution further improves the use of a ridge type or a pin and striking plate type contacting portion as occlusal registration components. The ridge type, also referred to as the ridge line, occlusal registration component is also disclosed in U.S. Provisional Application No. 62/512,075, filed 29 May 2017 at paragraph [00137] and at FIG. 6, FIG. 7, and FIG. 8. The ridge line occlusal registration component is also disclosed in co-pending PCT application PCT/US18/22243, filed 13 Mar. 2018 at paragraphs [0141] and [0142] and in FIG. 6 and FIG. 17. These related applications are hereby incorporated by reference herein in their entirety.

The solution to the problem of multiple appointments to obtain a final impression, a jaw registration, and visualizing tooth forms in the mouth is accomplished by ability to take at least one (such as maxillary or mandibular) final impression using the disclosed tray appliance system.

BRIEF DESCRIPTION OF DRAWINGS

The drawings illustrate preferred embodiments of the tray appliance system for making a dental prosthesis according to the disclosure. The reference numbers in the drawings are used consistently throughout. New reference numbers in FIG. 2 are given the 200 series numbers. Similarly, new reference numbers in each succeeding drawing are given a corresponding series number beginning with the figure number.

DESCRIPTION OF EMBODIMENTS

In the following description, reference is made to the accompanying drawings, which form a part hereof and which illustrate several embodiments of the present invention. The drawings and the preferred embodiments of the invention are presented with the understanding that the present invention is susceptible of embodiments in many different forms and; therefore; other embodiments may be utilized and structural; and operational changes may be made; without departing from the scope of the present invention.

A tray appliance system for use in providing dental services is disclosed. The tray appliance system is for making a dental prosthesis, which may be, for example, a maxillary denture, a set of dentures (3600), a dental implant supported prosthesis, a dental implant supported bridge, and the like, for a patient (3505). This is a tray appliance system for a human patient. For purposes of context, the patient (3505) has a mouth (3515) defined by a maxillary jaw (3510) and a mandibular jaw (3520). Additionally, the patient (3505) has an edentulous maxillary gum. The tray appliance system includes at a minimum a maxillary tray appliance (110) and optionally also includes a mandibular tray appliance (1610).

The tray appliance system allows the clinician and/or the patient (3505) to be able to visualize at least one first premolar tooth form (to be described later) within the mouth (3515) of the patient (3505), while being able to allow for an accurate jaw registration procedure. Optionally, the tray appliance system may additionally be used to take an impression of the edentulous maxillary gum and/or a mandibular gum (410) of the patient (3505).

Throughout this description, the term "impression material" may indicate any type of impression material suitable for taking an impression within the mouth (3515) of the patient (3505). Suitable impression materials include, but are not limited to, alginate type impression materials, silicone type impression materials, rubber base type impression materials, wax base impression materials, and the like.

Throughout this disclosure, the horizontal plane is defined as the Camper's plane when the maxillary tray appliance (110) is fitted to the mouth (3515) of the patient (3505). It is known in the field of dentistry that Camper's plane is also known as the Ala-tragus plane, and is often used as a horizontal reference plane. Additionally, the terms "higher" and "lower" as used to indicate vertical positioning is measured relative to the horizontal plane.

Figure 1:
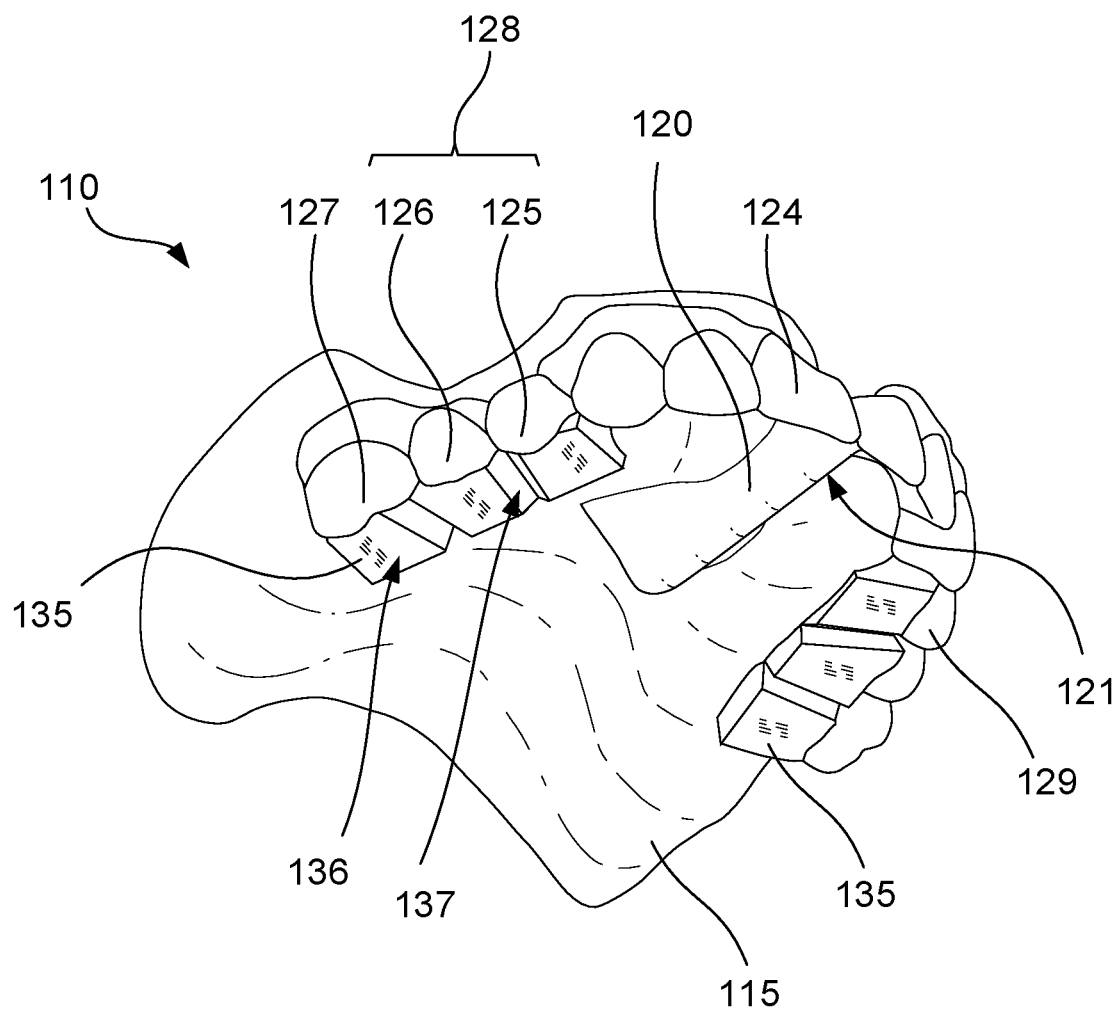
FIG. 1 is a bottom right perspective view of the tray appliance system including a maxillary tray appliance.

As shown in FIG. 1, the maxillary tray appliance (110) includes a first base portion (115), a first premolar tooth form (125), optionally a central incisor tooth form (124), optionally a contralateral first premolar tooth form (129), optionally a first contacting portion (120), and optionally a first bite material accepting portion (135).

The maxillary tray appliance (110) may additionally optionally include a second premolar tooth form (126), a first molar tooth form (127), and/or other tooth form(s) (not marked).

Figure 2:
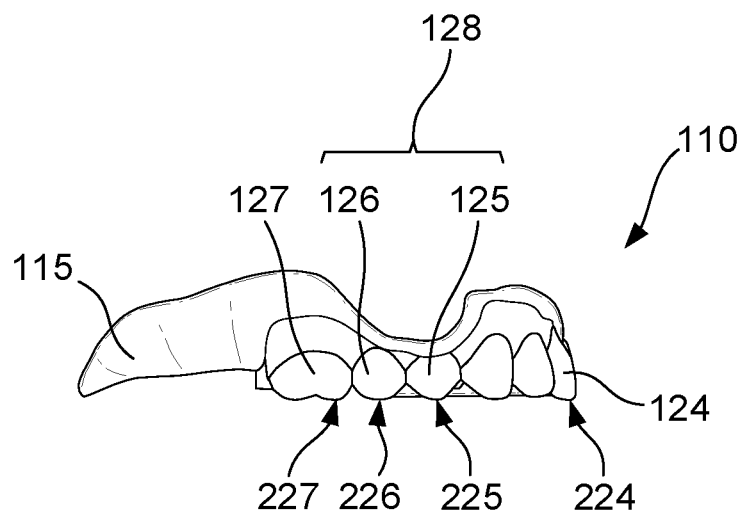
FIG. 2 is a right side perspective view of the maxillary tray appliance of FIG. 1.

As best shown in FIG. 2, the first premolar tooth form (125) defines a first premolar cusp tip (225). The second premolar tooth form (126), when present, defines a second premolar cusp tip (226). The first molar tooth form (127), when present, defines a first molar cusp tip (227). Specifically, the first molar cusp tip (227) indicates a mesio-buccal cusp tip of the first molar tooth form (127).

The first contacting portion (120), as shown in FIG. 1 and when present, is contoured to make contact with a contacting surface originating from the mandibular jaw (3520) of the patient (3505). The contacting surface may be a portion of either: (1) the mandibular tray appliance (1610), or (2) a mandibular anterior tooth, or (3) the mandibular gum (410).

Figure 5:
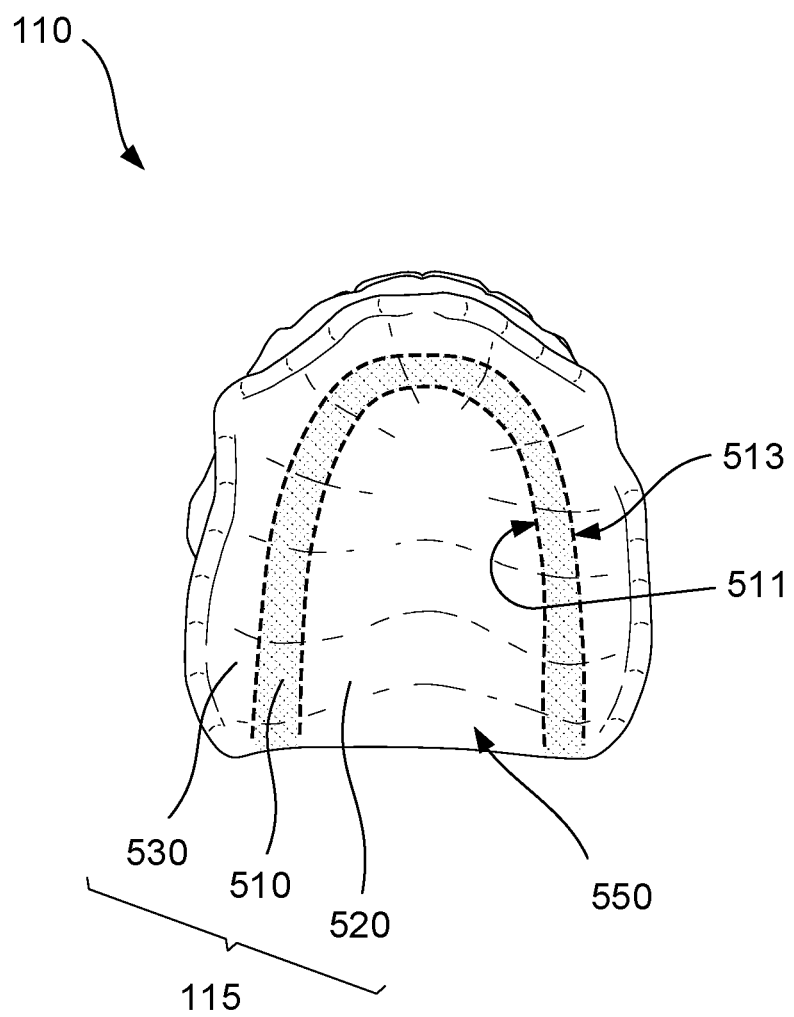
FIG. 5 is a top perspective view of the maxillary tray appliance of FIG. 1.

As shown in FIG. 5, the first base portion (115) includes a first U-shaped portion (510) being substantially U shaped in top view. The first U-shaped portion (510) is shown as shaded in FIG. 5. The first U-shaped portion (510) includes a lingual side (511) and a buccal side (513), both of which are marked with thick dashed lines, respectively. The term "substantially" is intended to subsume shapes that are U-shaped but may be interrupted. Thus, in this instance the first U-shaped portion (510) would be substantially U shaped if, in some embodiments, there are one or more apertures (not shown) defined by the first base portion (115). Therefore, the U shape of the first U-shaped portion (510) may be broken. Thus, the term "substantially U shaped," as used herein, means and includes a shape which has a continuous or a discontinuous U shape.

Figure 8:
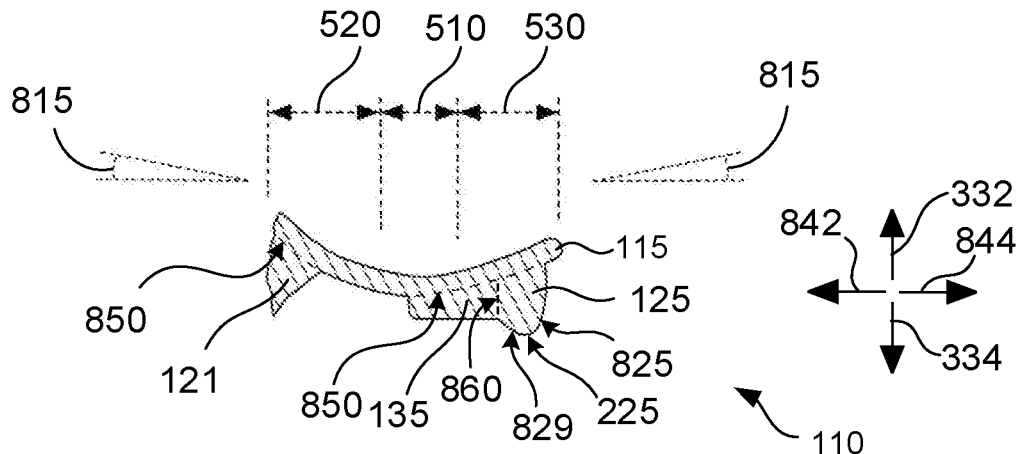
FIG. 8 is a cross-sectional view through section 8-8 of FIG. 7.

As shown in FIG. 5 and FIG. 8, the first U-shaped portion (510) of the first base portion (115) has an upward slope of no more than 10 degrees in bucco-lingual cross sectional view. The first base portion (115) further includes a first lingual portion (520) extending upwardly with slope of at least 10 degrees (815) from the lingual side (511) of the first U-shaped portion (510) (see also FIG. 8). The first base portion (115) may additionally include a first buccal portion (530) extending upwardly with slope of at least 10 degrees (815) from the buccal side (513) of the first U-shaped portion (510).

As shown in FIG. 8, the first lingual portion (520) advantageously serves to follow the contour of the edentulous maxillary gum of the patient (3505) such that the maxillary tray appliance (110) is in a desired proximity to the edentulous maxillary gum when fitted within the mouth (3515) of the patient (3505).

The first buccal portion (530), when present, may serve to provide additional surface area such that the maxillary tray appliance (110) may be held in place to the patient's edentulous maxillary gum without the maxillary tray appliance (110) being dislodged. Alternatively, when the maxillary tray appliance (110) is being used to carry impression material, the first buccal portion (530) provides additional support for impression material such that the impression material may be carried into the area between the edentulous gum and inner cheek, known commonly as the vestibule of the patient (3505).

When the maxillary tray appliance (110) is to be used to carry impression material for the purpose of taking an impression of the edentulous maxillary gum of the patient (3515), the impression material is placed on a first top surface (550) of the first base portion (115).

Similarly, when the mandibular tray appliance (1610) is to be used to carry impression material for the purpose of taking an impression of the edentulous mandibular gum of the patient (3515), the impression material is placed on a second bottom surface (1750) of the second base portion (1615).

It is preferred, but not essential the maxillary tray appliance (110) is a unitary piece, which means that it is made with all its portions being formed together as a unified whole. It is also preferred, but not essential that the mandibular tray appliance (1610) is a unitary piece. The maxillary tray appliance (110) may also be formed in two or more pieces, removably attached to each other using any attachment means, such as a hub and receptacle element, a clip element, a magnet, and the like.

The maxillary tray appliance (110) formed in two or more pieces may advantageously serve to allow for components of different sizes, shapes, and/or color to be utilized. For example, the first contacting portion (120) may be removably attached to the first base portion (115) such that multiple different sizes of first contacting portion (120) may be utilized. Similarly, the mandibular tray appliance (1610) may also be formed in two or more pieces.

It is preferred, but not essential that the maxillary tray appliance (110) is custom made to fit the edentulous maxillary gum of the patient (3505). When the maxillary tray appliance (110) is a unitary piece and custom made to fit the edentulous maxillary gum of the patient (3505), for example, the maxillary tray appliance (110) may be easier to manufacture than fabricating the maxillary tray appliance (110) in two or more pieces.

In some embodiments, the maxillary tray appliance (110) may be made, at least in part using a thermoplastic material, that is, a material which is substantially rigid at room temperature, but moldable at an elevated temperature, the elevated temperature being not so high as to burn the patient (3505). For example, suitable thermoplastic materials include, but are not limited to, polystyrene, polymethyl methacrylate, polytetrafluoroethylene, dental compound, and the like.

In some embodiments, different portions of the tray appliance may have different thermoplastic properties, for example, the first contacting portion (120) may have a higher melting temperature than, for example, the first base portion (115). This can be achieved in any known processes, such as, for example, dual shot injection molding, overmolding, and the like utilizing at least two materials. For example, a first material may be a material with a higher melting range, such as acrylonitrile butadiene styrene (ABS), which has a melting range of about 105° C. while a second material may be a material with a lower melting range, such as expanded polystyrene (EPS), which has a melting range of about 62° C. This advantageously allows the first base portion (115) to deform to adapt to a patient's jaw size, while preserving the shape of other portion(s) such as the first contacting portion (120), the first premolar tooth form (125), the first bite material accepting portion (135), and the like.

When the maxillary tray appliance (110) is made using at least one thermoplastic material, the maxillary tray appliance (110) may be custom formed in the mouth (3515) of the patient (3505).

In FIG. 8, direction arrows show a lingual (842) direction and a buccal (844) direction. A first base portion boundary (850) is marked with dashed lines. Since the maxillary tray appliance (110) is shown in a unitary piece formation, the first base portion boundary (850) is hypothetical because in some embodiments, it may not be a physical separation, but rather a designation to show what the portion would look like separated from its integration in the maxillary tray appliance (110). As described previously, the first base portion (115) is preferably 0.5 millimeters to 5 millimeters in thickness.

Figure 7:
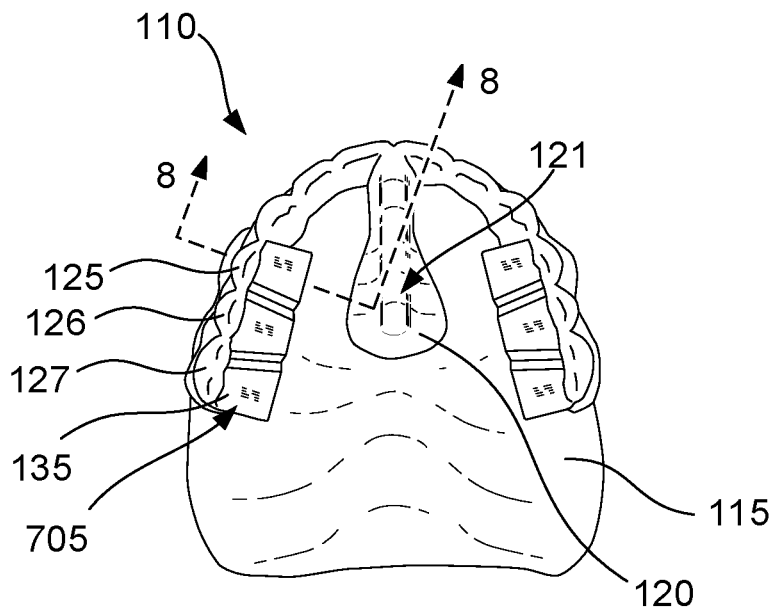
FIG. 7 is the bottom perspective view of FIG. 6 showing location of the first contacting portion.

As best shown in FIG. 7, in some embodiments, the first bite material accepting portion (135) may be abutted against a tooth form (e.g. first premolar tooth form (125)).

Figure 14:
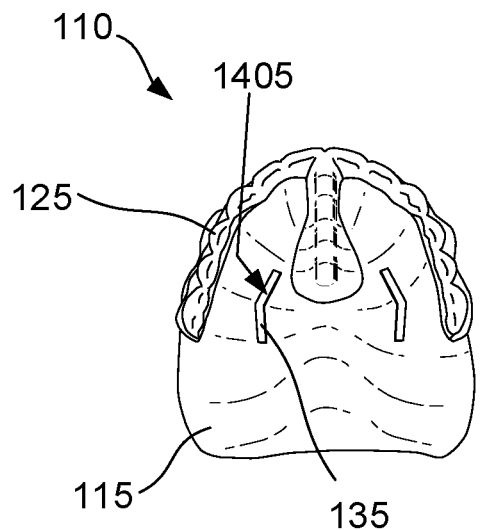
FIG. 14 is a bottom perspective view of an embodiment of the maxillary tray appliance with V shaped form first bite material accepting portion according to the embodiment of FIG. 6.
Figure 15:
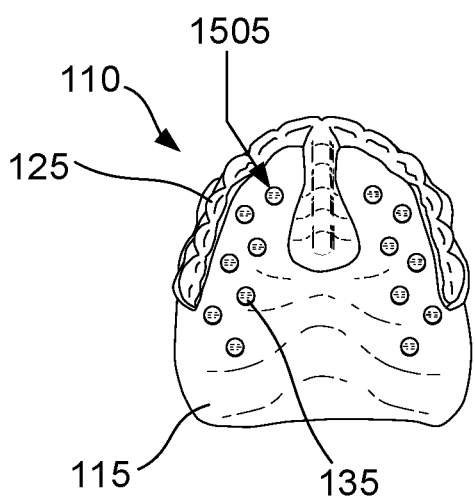
FIG. 15 is a bottom perspective view of an embodiment of the maxillary tray appliance with cylindrical form first bite material accepting portion according to the embodiment of FIG. 6.

As shown in FIG. 14 and FIG. 15, in some embodiments, the first bite material accepting portion (135) may not be in contact with the tooth form (e.g. first premolar tooth form (125)).

In FIG. 8, a tooth form boundary (860) is marked with a dashed line to show the theoretical boundary between the first premolar tooth form (125) and the first bite material accepting portion (135). The tooth form boundary (860) is defined as a vertically extending theoretical boundary extending from a lingual end of the tooth form (such as the first premolar tooth form (125) to the first base portion (115)).

Additionally, as shown in FIG. 1, the premolar tooth forms (128) mean and include the first premolar tooth form (125) and the second premolar tooth form (126).

Figure 33:
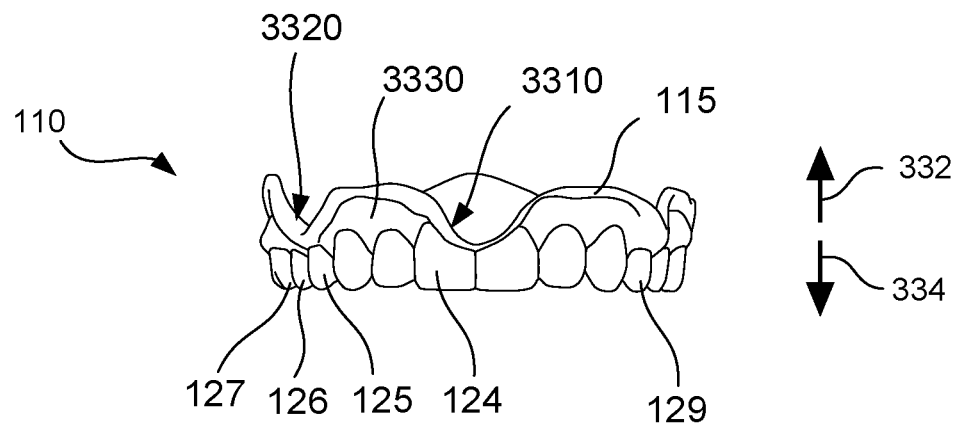
FIG. 33 is a front perspective view of the maxillary tray appliance of FIG. 1.
Figure 34:
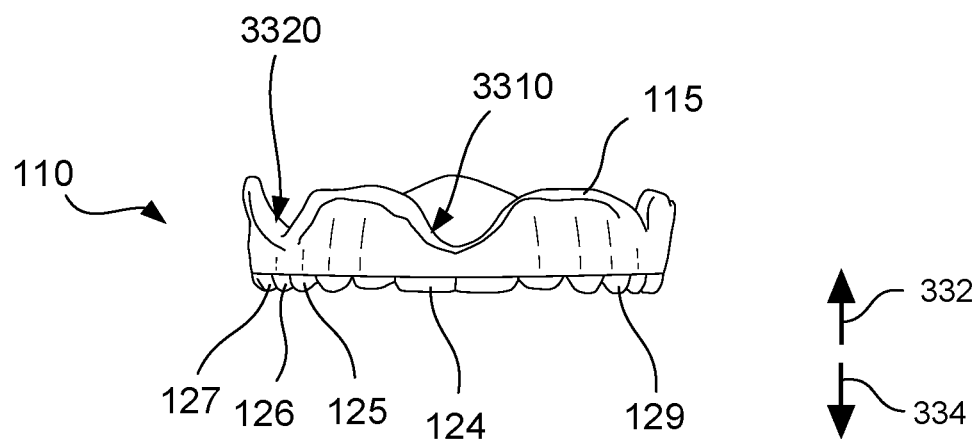
FIG. 34 is a front perspective view of an embodiment of the maxillary tray appliance having tooth forms defining facial contour with at least incisal 2 millimeters of facial surface of natural or artificial tooth according to the embodiment of FIG. 33.
Figure 35:
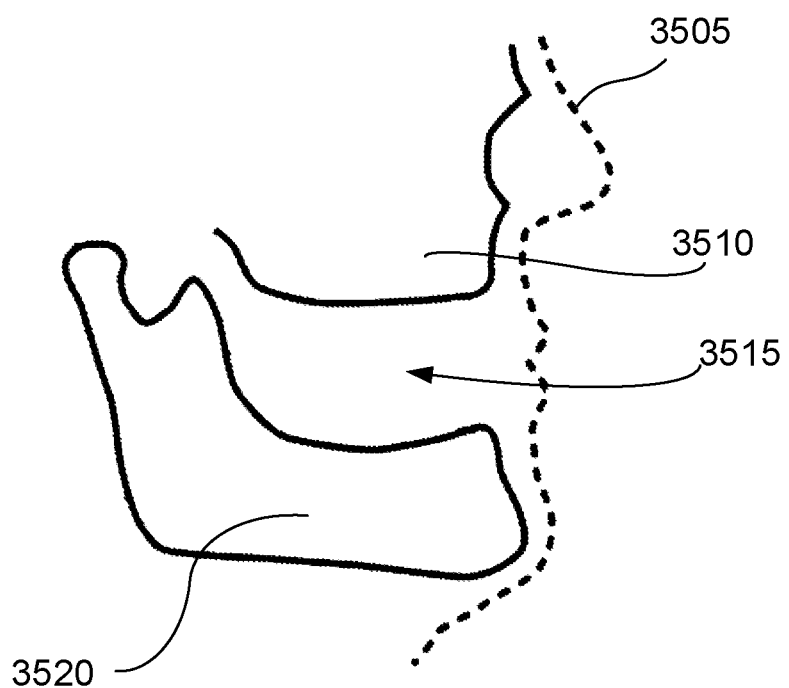
FIG. 35 is a partial side view of the head of a patient showing the relative location of the mouth, the maxillary jaw and the mandibular jaw.
Figure 36:
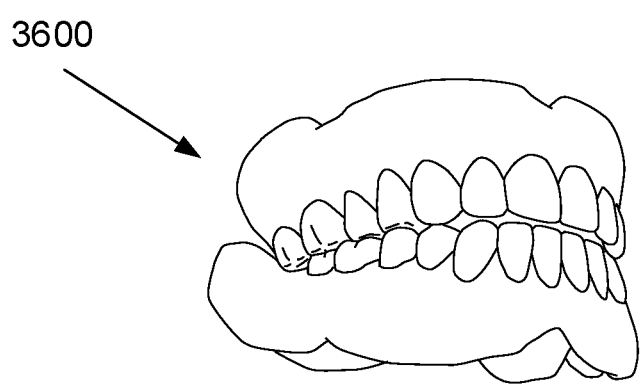
FIG. 36 illustrates an exemplary dental prosthesis.

As shown in FIG. 2, FIG. 33, and FIG. 34, the first premolar tooth form (125) defines a contour with at least an incisal 2 millimeters of a facial surface of a natural human maxillary first premolar tooth, or at least an incisal 2 millimeters of a facial surface of an artificial first premolar tooth.

As shown in FIG. 8, the first premolar tooth form (125) may include a first premolar facial surface (825) and optionally a first premolar lingual slope (829). The first premolar facial surface (825) may generally define a contour with at least the incisal 2 millimeters of the facial surface of natural or artificial first premolar tooth (see also FIG. 33 and FIG. 34).

When the first premolar facial surface (825) defines a contour with at least the incisal 2 millimeters of the facial surface of the natural or artificial first premolar tooth, the clinician and/or the patient (3505) would be able to recognize the first premolar tooth form (125) as having contour similar to a tooth, and would thus be able to determine whether its location within the mouth (3515) of the patient (3505) is acceptable. Similarly, as shown in FIG. 33 and FIG. 34, other tooth forms, such as the contralateral first premolar tooth form (129), the second premolar tooth form (126), the first molar tooth form (127), and/or other tooth form (not marked) may define a contour corresponding to a facial surface with at least an incisal 2 millimeters of a facial surface of a natural or artificial corresponding tooth.

Throughout this disclosure, the term artificial tooth indicates an artificial or prosthetic tooth made by any manufacturer for the purpose of replacing an individual's missing tooth. The artificial tooth may be, for example, a plastic denture tooth, a ceramic tooth, and the like. Thus, the term artificial premolar tooth may indicate any type of artificial premolar tooth, such as, for example 0 degree, 15 degree, 20 degree, 33 degree artificial premolar tooth made by any manufacturer.

The first premolar tooth form (125) is in a first premolar tooth position when the maxillary tray appliance (110) is fitted within the mouth (3515) of the patient (3505). And, the second premolar tooth form (126), when present, is in a second premolar tooth position when the maxillary tray appliance (110) is fitted within the mouth (3515) of the patient (3505). Since the first base portion (115) of the maxillary tray appliance (110) may be contoured to either accept the edentulous maxillary gum of the patient (3505) or impression material to be applied to the edentulous maxillary gum of the patient (3505), the position of the first premolar tooth form (125) and second premolar tooth form (126) may be a factor of intended use. Since different impression materials have different suitable thicknesses, the suitable thickness of the impression material may be factored in to positioning the first premolar tooth form (125) and/or the second premolar tooth form (126), respectively.

For example, if the maxillary tray appliance (110) is to be custom manufactured for use with high viscosity impression material, the first premolar tooth form (125) would be positioned lower than if the maxillary tray appliance (110) is to be custom manufactured for use without impression material (i.e. directly contacting the edentulous maxillary gum).

As shown in FIG. 33 and FIG. 34, when the central incisor tooth form (124) is present, the central incisor tooth form (124) may generally define a contour with at least a facial surface with at least an incisal 2 millimeters of a facial surface of a natural or artificial central incisor tooth. When the central incisor tooth form (124) is present, it may define a central incisor incisal end (224).

The term "generally define", as used throughout this description indicates the possible addition of additional features, for example, the first premolar facial surface (825) may include additional grooves, extensions, markings, and the like. For example, a groove may be included in the first premolar facial surface (825) to illustrate a tooth form plane, such that the groove can be visualized from outside the mouth (3515) and allow the clinician to align the groove to the face of the patient (3505) during use.

As shown in FIG. 8, the first premolar lingual slope (829) is not particularly limited. In one aspect, the first premolar lingual slope (829) may generally define a contour with at least an incisal 2 millimeters of a lingual slope of the natural or artificial first premolar tooth. In another aspect, the first premolar lingual slope (829) may not include tooth morphology such as grooves and/or fissures. In yet another aspect, the first premolar lingual slope (829) may be non-anatomical, for example, it may be substantially vertical (for example, between 80 degrees and 100 degrees) from the horizontal plane, or, for example, it may be substantially horizontal (for example, within 10 degrees from the horizontal plane).

Other tooth form(s), such as the contralateral first premolar tooth form (129), the second premolar tooth form (126), the first molar tooth form (127), and the like may each include their own corresponding facial surface and/or lingual slope, respectively, and may take configurations as described for the first premolar facial surface (825) and the first premolar lingual slope (829), respectively.

For example, when making the prosthesis, such as the set of dentures (3600), for the patient (3505), it is advantageous to enable the clinician and/or the patient (3505) to be able to visualize most teeth which will be replaced. The first premolar tooth form (125) being in a lateral aspect (that is, being off-center) of the smile of the patient (3505), enables the clinician and the patient (3505) to see if posterior teeth are in an acceptable location in the mouth (3515), and, for example, will allow for confirmation of tooth location and/or subsequent adjustment. It is a problem in the field of dentistry that dental prostheses often need to be remade because of unacceptable positioning of teeth (such as denture teeth in the set of dentures (3600)).

In one aspect, the first base portion (115) may include a first buccal portion (530) with slope of at least 10 degrees (815) from the buccal side (513) (see FIG. 5 and FIG. 8) of the first U-shaped portion (510). The first buccal portion (530) serves to provide additional area for accepting either the edentulous maxillary gum of the patient (3505) or impression material to be applied to the edentulous maxillary gum of the patient (3505). In another aspect, the first buccal portion (530) may not be included (not shown).

Figure 6:
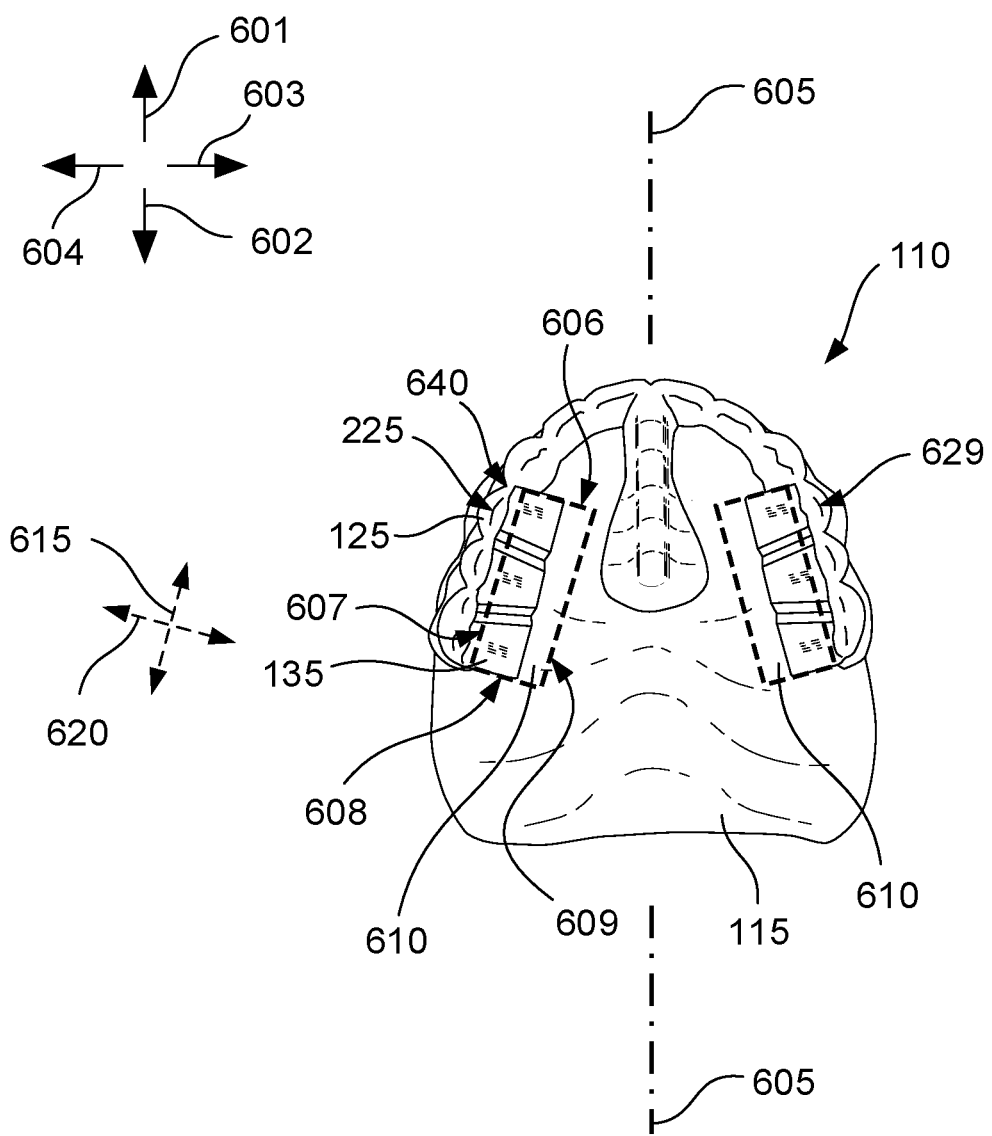
FIG. 6 is a bottom perspective view of the maxillary tray appliance of FIG. 1.

Some directions referred to herein are illustrated in FIG. 6 where the anterior direction (601), the posterior direction (602), the patient's left side (603), and the patient's right side (604) are indicated in the context of the bottom view of the maxillary tray appliance (110). As illustrated in FIG. 6 is an example of the premolar bucco-lingual axis (620) and the premolar mesio-distal axis (615) on the patient's right side (604) is shown. Normally, the premolar bucco-lingual axis (620) is 90 degrees from the premolar mesio-distal axis (615) in bottom view.

As shown in FIG. 6, the maxillary tray appliance (110) includes a sagittal midline (605). The premolar mesio-distal axis (615) is typically about 10 degrees to 20 degrees from the sagittal midline (605) in bottom view. The premolar mesio-distal axis (615) is determined by the morphology of the first premolar tooth form (125). Of course, the contralateral first premolar tooth form (129) defines a contralateral premolar mesio-distal axis (not marked) and a contralateral premolar bucco-lingual axis (not marked).

There are two standard numbering systems for teeth: the Universal Numbering System and the ISO numbering system. Throughout the disclosure herein, the term "first premolar tooth" designates tooth #5 or tooth #12, in the Universal Numbering System. Throughout this disclosure, the term "first premolar tooth" designates tooth #14 or tooth #24, in the ISO numbering system.

Figure 3:
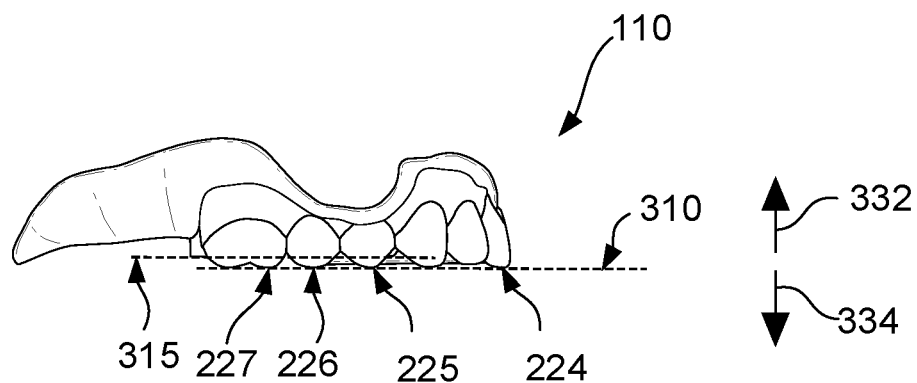
FIG. 3 is the right side perspective view of FIG. 2 showing incisal plane and first bite portion lower end.

In FIG. 3, FIG. 33, FIG. 34, direction arrows indicate a maxillary apical direction (332) and a maxillary incisal direction (334), respectively.

As shown in FIG. 6, the contralateral first premolar tooth form (129) may define a contralateral first premolar cusp tip (629).

As shown in FIG. 3, the first premolar cusp tip (225), the central incisor incisal end (224), and the contralateral first premolar cusp tip (629) (see FIG. 6) define an incisal plane (310).

Additionally, in regard to layouts as exemplified in FIG. 3, it is preferable, but not essential, that the first premolar cusp tip (225), the second premolar cusp tip (226), the first molar cusp tip (227) are generally coplanar with respect to the incisal plane (310). The term "generally coplanar", as used herein indicates an offset of no more than 2 millimeters from the incisal plane (310). This configuration advantageously serves to give the tooth forms a natural appearance. Additionally, this configuration enables the maxillary tray appliance (110) to be placed against a flat surface and not be prone to tipping. For example, following an impression taking procedure, the maxillary tray appliance (110) may be placed against a mounting table for a dental articulator (not shown), with the maxillary tray appliance (110) being placed on the mounting table with stability.

No Lingual Cusp

Figure 9:
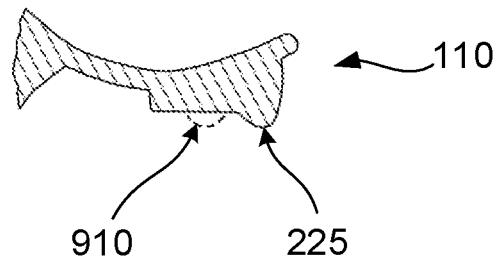
FIG. 9 is the cross-sectional view of FIG. 8 showing hypothetical location of lingual cusp of first premolar tooth form.

As a distinctive feature with an important purpose, the first premolar tooth form (125) has no lingual cusp. The contralateral first premolar tooth form (129), additionally has no lingual cusp. As shown in FIG. 9, a hypothetical lingual cusp (910) is marked in FIG. 9 with a dashed line to indicate its hypothetical position had it been present. The absence of the lingual cusp incorporates the appearance of teeth in anatomically suitable locations in frontal view (see FIG. 33), such that the clinician and/or the patient (3505) can evaluate what teeth would look like in the mouth (3515) while being able to perform the jaw registration procedure at the same time.

First Contacting Portion

The first contacting portion (120), when present, may be one of an anterior-posterior ridge type first contacting portion (121), a plate type (2420) contacting portion, a pin type (2520) contacting portion, or a transverse ridge type first contacting portion (2920), which is essentially a horizontal ridge type contacting portion. As will be described later, these types of first contacting portion (120) each serve as a jaw alignment component that can accommodate a variety of configurations of natural jaw positions while adding stability to aid in occlusal registration.

First Area

As described previously, the first premolar tooth form (125) defines the premolar bucco-lingual axis (620) and the premolar mesio-distal axis (615) in bottom view, as illustrated in FIG. 6. The first premolar tooth form (125) additionally defines a first premolar mesial end (640).

The maxillary tray appliance (110) is contoured to accept a bite registration material when the patient (3505) bites down to enable the dental prosthesis to be made therewith. The bite registration material (or simply "bite material") is well known in the art for use in the jaw registration procedure. The bite registration material is used to make rigid bite impressions and capture an accurate representation of the patient's bite. Any bite registration material may be used in combination with any of the various embodiments. Exemplary known bite registration materials include a silicone material, a polyether material, a polysulfide material, a light cured material, a wax, dental compound, and/or a self-cured material and/or any combinations thereof and the like.

The maxillary tray appliance (110) optionally defines a first area (610) for accepting the bite registration material surrounded by a first buccal boundary (607), a first mesial boundary (606), a first lingual boundary (609), and a first distal boundary (608). In FIG. 6, the first buccal boundary (607), the first mesial boundary (606), the first lingual boundary (609), and the first distal boundary (608) are each marked with thick dashed lines, respectively.

The first area (610) is essentially an area that is: (a) on a generally lateral aspect of the maxillary tray appliance (110), (b) in a generally middle portion anterior-posteriorly. This area is important because it is: (a) sufficiently away from the tongue; (b) accessible to a bite registration material dispensing device; and (c) sufficiently away from the cheek.

The first buccal boundary (607) is parallel to the premolar mesio-distal axis (615) in bottom view, as shown in FIG. 6, and is 3 millimeters lingual to the first premolar cusp tip (225).

The first mesial boundary (606) is parallel to the premolar bucco-lingual axis (620) in bottom view as shown in FIG. 6. The first mesial boundary (606) is collinear with the first premolar mesial end (640). The first lingual boundary (609) is 10 millimeters lingual to the first buccal boundary (607) and is parallel to the first buccal boundary (607). The first distal boundary (608) is 20 millimeters distal to the first mesial boundary (606) and parallel to the first mesial boundary (606). These millimeter dimensions are defined so that anything outside of the "first area" is not to be considered the first bite material accepting portion (135).

It has been determined that the first area (610) being in a centralized location anterior-posteriorly, being accessible to an impression material dispenser, and being away from the tongue, would allow the bite registration material to be placed and allowed to set without being disturbed is an ideal location for placement of the bite registration material for the purpose of bite registration. Of course, the bite registration material may be placed beyond the boundaries of the first area (610), such as anteriorly to or posteriorly to the first area (610), and would thus allow for additional stability of the maxillary tray appliance (110) during the jaw registration procedure.

It is a known problem that most bite registration materials used in dentistry have polymerization shrinkage properties. Polymerization shrinkage of the bite registration material would lead to inaccuracy in the jaw registration procedure. Therefore, it would be advantageous to reduce the overall thickness in a vertical direction of the bite registration material to be used within the first area (610). Additionally, it is a known problem that bite registration materials are prone to slipping off of dental trays. Therefore, it would be advantageous to provide elements which have anti-slip properties within the first area (610). Yet additionally, the bite registration material may be prone to breaking, such as, for example, if the bite material is too thin after being set, and/or if there are voids in the bite material, the bite registration material may be prone to breaking, leading to inaccuracy to the jaw registration procedure. Various features of the various embodiments and/or aspects described herein may advantageously contribute to decreasing the amount of polymerization shrinkage, decreasing slippage of the bite registration material, and/or reducing likelihood of the bite registration material breaking.

Bite Material Accepting Portion

In some embodiments, the maxillary tray appliance (110) may include the first bite material accepting portion (135). When the first bite material accepting portion (135) is present, at least a portion of the first bite material accepting portion (135) is disposed within the first area (610) (see FIG. 6).

Figure 10:
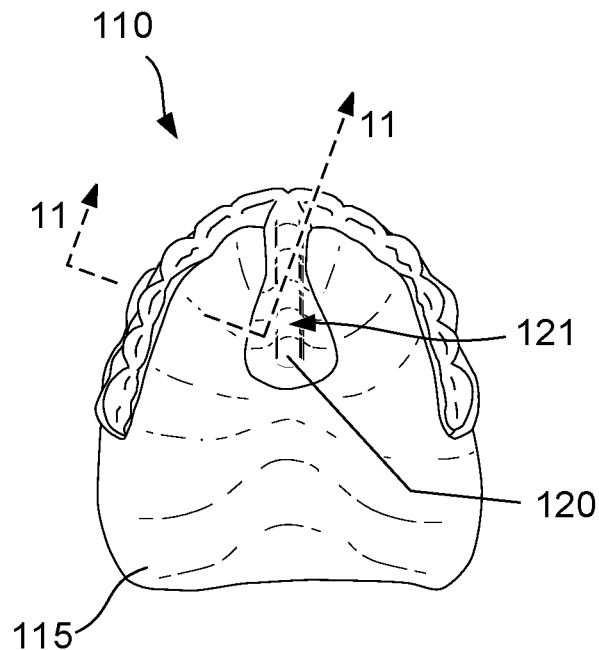
FIG. 10 is a bottom perspective view of an embodiment of the maxillary tray appliance with no first bite material accepting portion according to the embodiment of FIG. 6.
Figure 11:
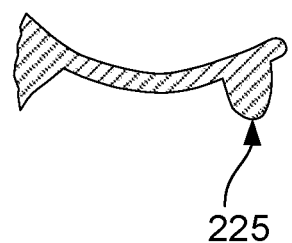
FIG. 11 is a cross-sectional view through section 11-11 of FIG. 10.

As shown in FIG. 10 and FIG. 11, in some embodiments, the first bite material accepting portion (135) may not be included in the maxillary tray appliance (110). This embodiment may be especially advantageous if, for example, the patient (3505) has a large maxillary tuberosity. When the patient (3505) has a large maxillary tuberosity relative to the norm, the amount of vertical space available for bite registration would be limited, and thus may not allow for the first bite material accepting portion (135) to downwardly extend from the first base portion (115). Additionally, if a high viscosity impression material (such as alginate or heavy body silicone impression material) were to be used for impression taking (e.g., placed on the first top surface (550)), there would also be little vertical room for bite registration material. The embodiment shown in FIG. 10 and FIG. 11 may advantageously allow the clinician and/or the patient (3505) to visualize tooth forms in the mouth (3515) of the patient (3505), while allowing for sufficient room for bite registration material to be applied to the first area (610).

As shown in FIG. 1, the first bite material accepting portion (135) may include a first bottom surface (136). In some embodiments, at least a portion of the first bottom surface (136) may be flat. Such a configuration advantageously serves to support the bite registration material, and may prevent inaccuracies due to polymerization shrinkage of the bite registration material and/or the bite registration material breaking (e.g. reducing amount of voids in the bite registration material).

Additionally, as shown in FIG. 1 and FIG. 3, in some embodiments, when the first bottom surface (136) is flat, the first bottom surface (136) may optionally be substantially parallel (that is, within 10 degrees in side view) to the incisal plane (310). This configuration may advantageously serve to provide a flat surface that is perpendicular to the direction of masticatory forces, which, in turn, prevents slipping and/or dislodgement of the bite registration material during the jaw registration procedure. Additionally and/or alternatively, the first bottom surface (136) being substantially parallel to the incisal plane (310) may advantageously serve to hide the first bite material accepting portion (135) from view, such as shown in FIG. 2 and FIG. 3, such that the clinician and/or the patient can visualize the first premolar tooth form (125), the second premolar tooth form (126) and/or the first molar tooth form (127).

It will be understood that the first bottom surface (136) is not limited to being substantially flat, and may take any suitable form, such as multiplanar, cylindrical, multilobular, and the like.

As shown in FIG. 1, the first bite material accepting portion (135) may optionally include an anti-slip element (137). The anti-slip element (137) may be defined by the first bite material accepting portion (135) (see FIG. 1), and/or may be defined by the first base portion (115) (not shown). As shown in FIG. 1, the anti-slip element (137) may be in the form of a small channel, a small indentation, a small protrusion, and the like. The anti-slip element (137) serves to prevent the bite registration material from slipping off of the first bite material accepting portion (135). As shown in FIG. 1 and FIG. 2, in some embodiments, when the anti-slip element (137) is in the form of a small channel as shown, the anti-slip element may be disposed between two tooth forms, such as the first premolar tooth form (125) and the second premolar tooth form (126), such that the first bite material accepting portion (135) cannot be visualized in a side view (see FIG. 2). In the context of the anti-slip element, the term small indicates a vertical height of less than 5 millimeters.

Figure 12:
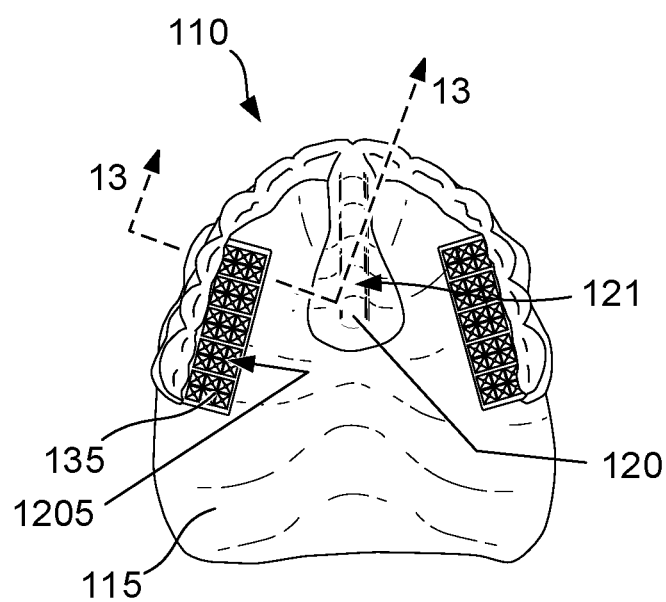
FIG. 12 is a bottom perspective view of an embodiment of the maxillary tray appliance with multifaced form first bite material accepting portion according to the embodiment of FIG. 6.
Figure 13:
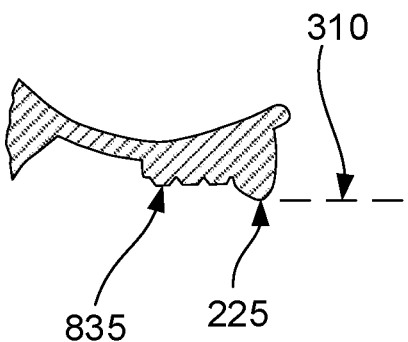
FIG. 13 is a cross-sectional view through section 13-13 of FIG. 12.

In some embodiments, as shown in FIG. 7 and FIG. 12, the first bite material accepting portion (135) may be in direct contact with at least one of the tooth form(s) (e.g. the first premolar tooth form (125)), such that there is increased strength to prevent breakage of the maxillary tray appliance (110). In some embodiments, as shown in FIG. 14 and FIG. 15, the first bite material accepting portion (135) and the tooth form(s) (e.g. the first premolar tooth form (125)) may not be in contact, such that bite registration material is prevented from slipping off of the first bite material accepting portion (135).

As described previously, the first top surface (550) may be contoured to accept the edentulous maxillary gum of the patient (3505) or accept impression material to be applied to the edentulous maxillary gum of the patient (3505).

When the first top surface (550) is used to accept impression material, the maxillary tray appliance (110) may be utilized for an impression taking and jaw registration procedure including the steps of: (1) applying impression material to the first top surface (550); (2) pressing the maxillary tray appliance (110) against the edentulous maxillary gum of the patient (3505); (3) applying the bite registration material to the first area (610); (4) instructing the patient (3505) to bite down such that the bite registration material is deformed; (5) setting the bite registration material.

The impression taking and jaw registration procedure has several advantages over prior art methods, including: (1) less overall time needed for fabricating a dental prosthesis; (2) since the impression material had been placed on the first top surface (550) and pressed against the edentulous maxillary gum of the patient (3505), the maxillary tray appliance (110) will be very stable, and will not dislodge from the edentulous maxillary gum of the patient (3505), leading to a more accurate jaw registration procedure.

The mandibular tray appliance (1610) may include a second contacting portion (1620). The second contacting portion (1620) provides a contacting surface or landing surface for the first contacting portion (120) when the tray appliance system is fitted within the mouth (3515) of the patient (3505).

When the first top surface (550) is used to accept impression material, the clinician may, for example, press down on the maxillary tray appliance (110) with more force on one side of the maxillary tray appliance (110) than the other side when the impression material is setting. This may cause the maxillary tray appliance (110) to be rotationally misaligned to the maxilla, that is, one side of the maxillary tray appliance (110) may be lower than the other side of the maxillary tray appliance (110). This misalignment may cause a lateral aspect of the maxillary tray appliance (110) and a lateral aspect of the mandibular tray appliance (1610) to contact each other, instead of the first contacting portion (120) and the second contacting portion (1620) making contact. If the lateral aspect of the maxillary tray appliance (110) and the lateral aspect of the mandibular tray appliance (1610) were to make contact, the maxillary tray appliance (110) and/or the mandibular tray appliance (1610) may be dislodged, that is, separate from contact with the patient's gum. This may result in the jaw registration procedure being inaccurate, and may lead to subsequent fabrication of a dental prosthesis that does not have accurate occlusion.

FIG. 10 and FIG. 11 illustrates one embodiment in which the maxillary tray appliance (110) does not include the first bite material accepting portion (135). This embodiment may be especially advantageous for use in a patient who does not have much vertical space for the bite registration material, for example, for a patient who has a large maxillary tuberosity.

As shown in FIG. 1, FIG. 2, and FIG. 3, in some embodiments, the first bite material accepting portion (135) extends downwardly no further than the incisal plane (310). In FIG. 3, a first bite portion lower end (315) is marked in dashed line. The first bite portion lower end (315) represents a vertical level of a lowest point of the first bite material accepting portion (135) relative to the incisal plane (310). This configuration advantageously allows for rotational and/or translational freedom while reducing the amount of vertical height of the bite registration material (see FIG. 20 and FIG. 21). Additionally, this configuration advantageously allows for the tooth forms (such as the first premolar tooth form (125)) to be trimmed (e.g. ground down) while allowing the bite registration material to be completely seated. For example, if the maxillary tray appliance (110) was skewed to one side during impression taking, such as the left side being lower than the right side, then the left side tooth forms may be trimmed off prior to setting the maxillary tray appliance (110) on to the dental articulator.

As shown in FIG. 3, in some embodiments, the first bite material accepting portion (135) may extend downwardly no further than 1 millimeter to 5 millimeters to the incisal plane. Since, as previously described, most bite registration materials used in dentistry undergo polymerization shrinkage, this configuration further advantageously allows for rotational freedom and/or translational freedom while reducing the amount of vertical height of the bite registration material. Additionally, this configuration allows for negative space between the tooth forms (such as the first premolar tooth form (125), second premolar tooth form (126), first molar tooth form (127), central incisor tooth form (124)) to be seen. The presence of this negative space, known in the art as "embrasure" around tooth forms is desirable for the tooth forms to appear natural.

Figure 4:
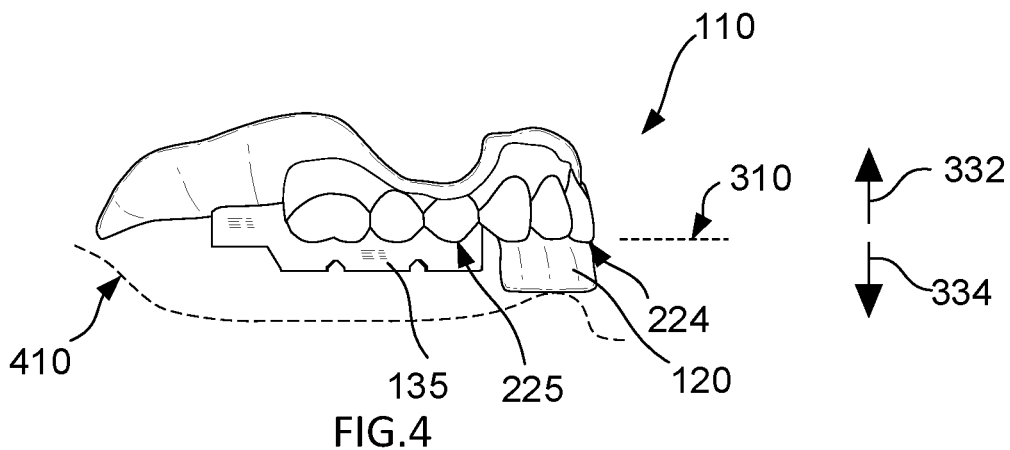
FIG. 4 is a right side perspective view of an embodiment of the maxillary tray appliance with first bite material accepting portion extending downwardly past the incisal plane according to the embodiment of FIG. 2.

Referring to FIG. 4, in some embodiments, the first bite material accepting portion (135) may extend downwardly past the incisal plane (310), preferably no further than 30 millimeters past the incisal plane (310). This configuration may, for example, be used when the patient (3505) is completely edentulous, and no mandibular tray appliance (1610) is to be used. As shown in FIG. 4, in this situation, the first contacting portion (120) may extend downwardly beyond the central incisor incisal end (224), and make contact with the patient's edentulous mandibular gum (410). In FIG. 4, the patient's edentulous mandibular gum (410) is marked with a dashed line. If the bite material accepting portion extends downwardly more than 30 millimeters past the incisal plane (310), then the patient's occlusal vertical dimension will be too tall.

Block Like Form

When viewed in bottom view, the first bite material accepting portion (135) may take a contour including, but not limited to: a block-like form (705), a multifaced form (1205), and/or a cylindrical form (1505). The block-like form (705), the multifaced form (1205), and/or the cylindrical form (1505) may each advantageously serve, for example, to provide suitable amount of vertical room for the bite registration material, prevent dislodgement of the bite registration material, and/or provide room for the tongue. Providing room for the tongue serves to prevent dislodgement.

As shown in FIG. 14, optionally, the first bite material accepting portion (135) may take, at least in part, a V shaped form (1405) in a bottom view. The V shaped form (1405) advantageously serves to prevent the bite registration material from being dislodged laterally and/or slipping when there is little vertical space for the bite registration material. This is especially advantageous for patients who have large maxillary tuberosities.

Second Base Portion

The tray appliance system optionally includes the mandibular tray appliance (1610). The mandibular tray appliance (1610) includes a second base portion (1615).

The mandibular tray appliance (1610) is useful when the patient is completely edentulous, that is, completely without teeth in both the maxilla and mandible. When the patient is completely edentulous, the second base portion (1615) may have a predetermined shape contoured to accept either: (1) the edentulous mandibular gum (410) of the patient, or (2) impression material to be applied to the patient's edentulous mandible.

Specifically, the second base portion (1615) includes the second bottom surface (1750). The second bottom surface (1750) may be contoured to accept the patient's edentulous mandible or accept impression material to be applied to the patient's edentulous mandible.

The second base portion (1615) includes a second U-shaped portion (1810). The second U-shaped portion (1810) is shown as shaded in FIG. 18 and FIG. 19. The second U-shaped portion (1810) is substantially U shaped in bottom view. As described previously, the term "substantially U shaped" indicates a shape that is either a continuous or discontinuous U shape. Thus, in this instance the second U-shaped portion (1810) would be substantially U shaped if, in some embodiments, there are one or more apertures defined by the second base portion (1615) (not shown). Therefore, the U shape of the second U-shaped portion (1810) may be broken.

Figure 18:
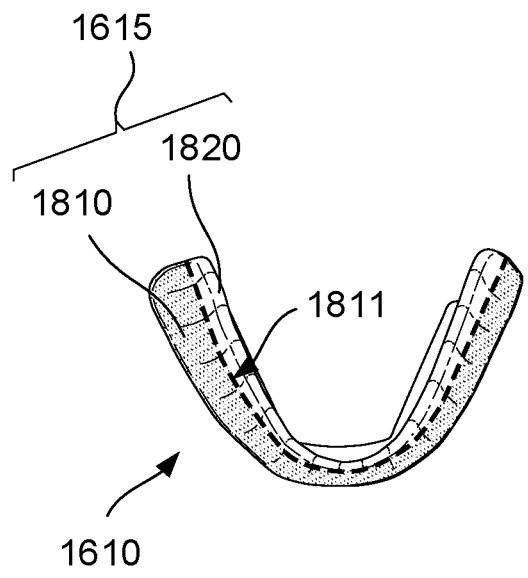
FIG. 18 is the bottom perspective view of the mandibular tray appliance of FIG. 17 showing location of second U-shaped portion.

Optionally, the second U-shaped portion (1810) may include a second lingual side (1811), marked with thick dashed line in FIG. 18. The second base portion (1615) may optionally include a second lingual portion (1820) extending downwardly with slope of at least 10 degrees from the second lingual side (1811) of the second U-shaped portion (1810), see also FIG. 23.

Figure 19:
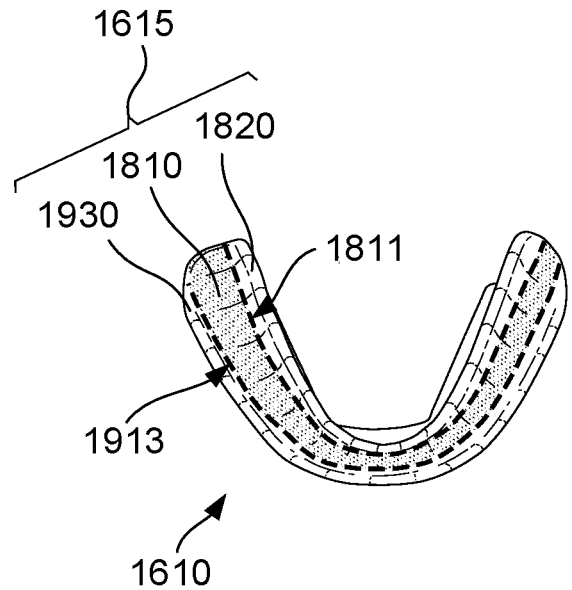
FIG. 19 is a bottom perspective view of an embodiment of the mandibular tray appliance with second buccal portion according to the embodiment of FIG. 18.

As shown in FIG. 19, the second U-shaped portion (1810) may further optionally include a second buccal side (1913), marked with thick dashed line in FIG. 19. The second base portion (1615) may further optionally include a second buccal portion (1930) extending downwardly with slope of at least 10 degrees from the second buccal side (1913) of the second U-shaped portion (1810).

As described previously, the first contacting portion (120), when present, is contoured to make contact with a contacting surface originating from the mandibular jaw (3520) of the patient (3505). The contacting surface may be a portion of either: (1) the mandibular tray appliance (1610), or (2) the mandibular anterior tooth, or (3) the mandibular gum (410). The first contacting portion (120) may take one of several types or forms.

FIG. 1 shows the anterior-posterior ridge type first contacting portion (121), which is preferably anterior-posteriorly elongate in form. That is, the anterior-posterior ridge type first contacting portion (121) is longer in an anterior-posterior direction than it is wide in a transverse direction along a bottom 2 millimeter surface. Preferably, the anterior-posterior ridge type first contacting portion (121) is configured with a contacting surface having an anterior-posterior length that is at least twice as long as a transverse width. This is described in further detail in co-pending PCT application PCT/US18/22243, which is incorporated herein in its entirety.

Since the purpose of the first contacting portion (120) is to contact the surface originating from the mandibular jaw, the elongate form of the anterior-posterior ridge type first contacting portion (121) advantageously may serve to accommodate a variety of jaw configurations, such as orthognathic, prognathic, or retrognathic jaw configurations. Additionally, and/or alternatively, the elongate form of the anterior-posterior ridge type first contacting portion (121) may serve to direct vector forces during contact to be substantially centered (that is, not too far off to the left side or right side), thus preventing tipping of the tray and/or off-center biting by the patient (3505).

As described previously, the mandibular tray appliance (1610) may include the second contacting portion (1620). The second contacting portion (1620) provides a contacting surface or landing surface for the first contacting portion (120) when the tray appliance system is fitted within the mouth (3515) of the patient (3505). That is, when the maxillary tray appliance (110) and the mandibular tray appliance (1610) are fitted in the mouth of the patient (3505), the first contacting portion (120) and the second contacting portion (1620) make contact when the patient (3505) bites down.

The mandibular tray appliance (1610) may further include a second bite material accepting portion (1635), which is intended to accept the bite registration material when the patient (3505) bites down to enable the dental prosthesis to be made therewith. That is, for example, the tray appliance system, with the addition of the bite registration material may enable the dental prosthesis to be made using any method known in the art, such as with use of the dental articulator, or using any computer aided design/computer aided manufacturing (CAD/CAM) method, or combination of methods.

Figure 16A:
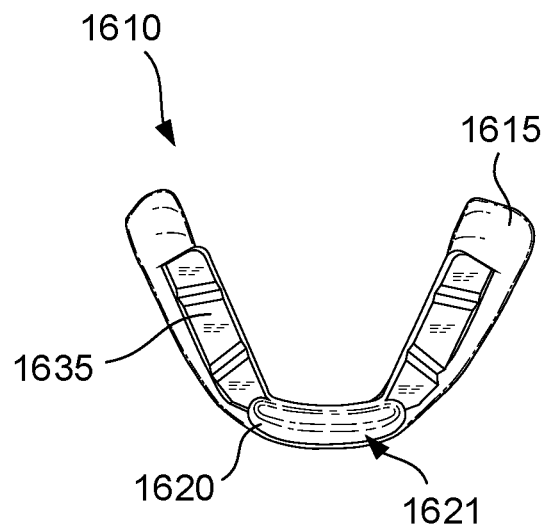
FIG. 16A is a top perspective view of a mandibular tray appliance.
Figure 16B:
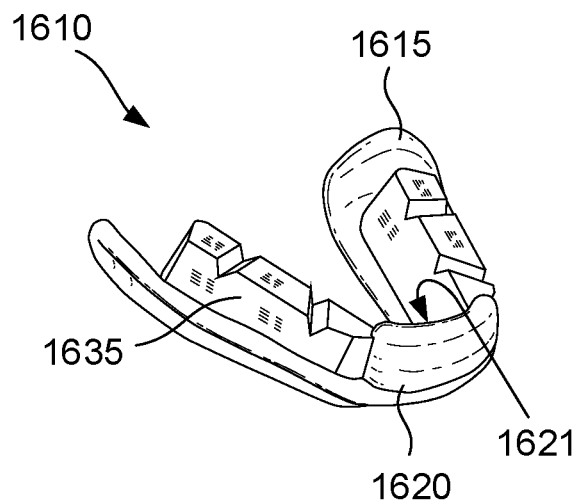
FIG. 16B is a top right perspective view of the mandibular tray appliance of FIG. 16A.
Figure 17:
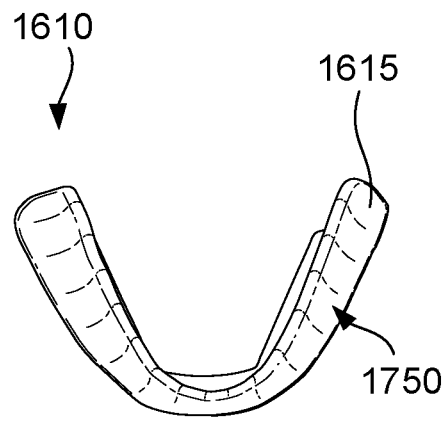
FIG. 17 is a bottom perspective view of the mandibular tray appliance of FIG. 16A.

When the first contacting portion (120) is the anterior-posterior ridge type first contacting portion (121), the second contacting portion (1620) may be a second ridge type contacting portion (1621). As shown in FIG. 16A, the second ridge type contacting portion (1621) may be either straight or arcuate in top view. This is described in further detail in co-pending PCT application PCT/US18/22243.

Figure 29:
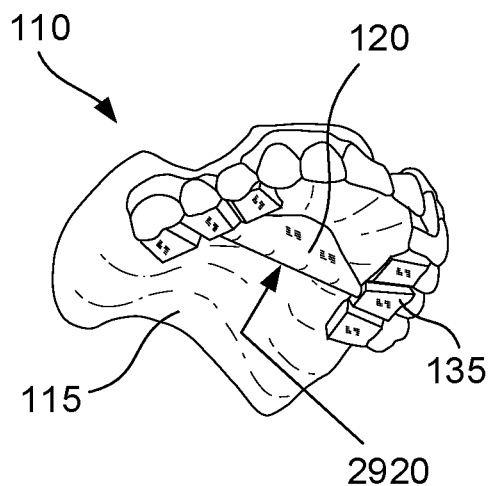
FIG. 29 is a bottom right perspective view of an embodiment of the maxillary tray appliance having transverse ridge type first contacting portion according to the embodiment of FIG. 1.
Figure 30:
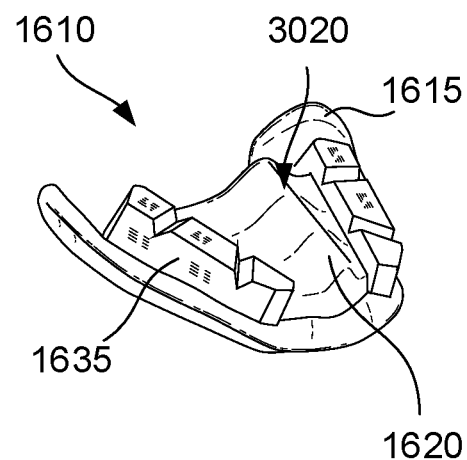
FIG. 30 is a top right perspective view of an embodiment of the mandibular tray appliance having anterior-posterior ridge type second contacting portion according to the embodiment of FIG. 16B.

Referring to FIG. 29, when the first contacting portion (120) is a transverse ridge type first contacting portion (2920), the second contacting portion (1620) is preferably an anterior-posterior ridge type (3020).

In some embodiments, the first contacting portion (120) may be the plate type (2420). That is, the first contacting portion (120) may be substantially planar, that is, having upward or downward slope of no more than 10 degrees. The plate type (2420) of the first contacting portion (120) may be utilized with the pin type (2520) second contacting portion (1620).

Figure 26:
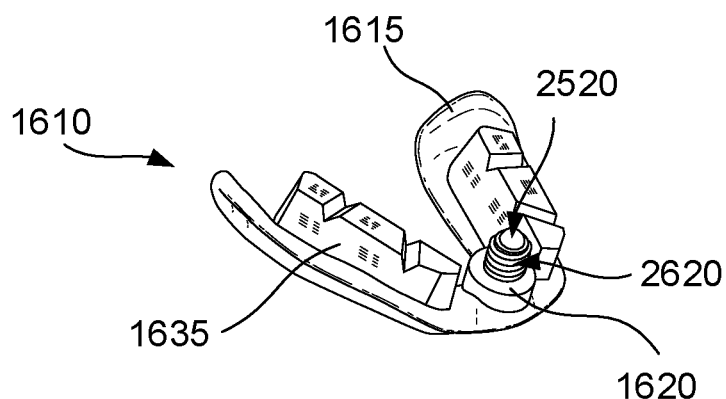
FIG. 26 is a top right perspective view of an embodiment of the mandibular tray appliance having threading according to the embodiment of FIG. 25.

As illustrated in FIG. 26, the pin type (2520) second contacting portion (1620) may additionally include a threading (2620). The threading (2620) may thus allow the pin type (2520) second contacting portion (1620) to be adjusted to extend upwardly or downwardly.

Figure 27:
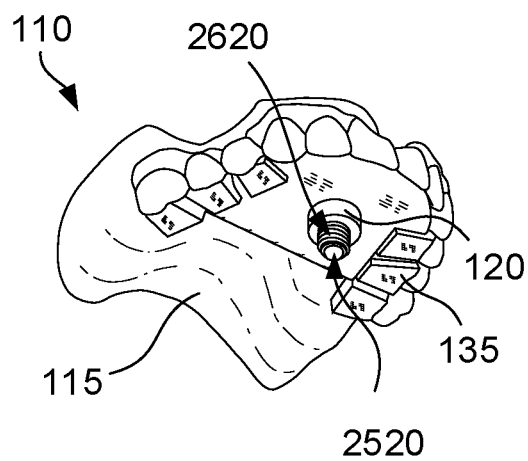
FIG. 27 is a bottom right perspective view of an embodiment of the maxillary tray appliance having pin type first contacting portion according to the embodiment of FIG. 1.
Figure 28:
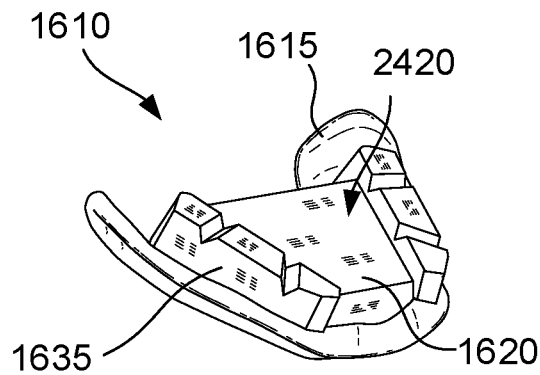
FIG. 28 is a top right perspective view of an embodiment of the mandibular tray appliance having plate type first contacting portion according to the embodiment of FIG. 16B.

As illustrated in FIG. 27, in some embodiments, the first contacting portion (120) may be the pin type (2520). The pin type (2520) first contacting portion (120) may also include the threading (2620). As shown in FIG. 28, the pin type (2520) first contacting portion (120) may be used with the plate type (2420) second contacting portion (1620).

The variety of types of first contacting portion (120) and second contacting portion (1620) are occlusal registration components and serve an important purpose in accurate bite registration.

Figure 31:
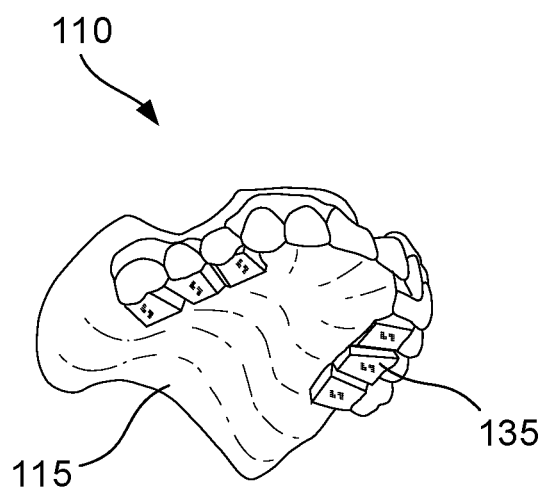
FIG. 31 is a bottom right perspective view of an embodiment of the maxillary tray appliance having no first contacting portion according to the embodiment of FIG. 1.
Figure 32:
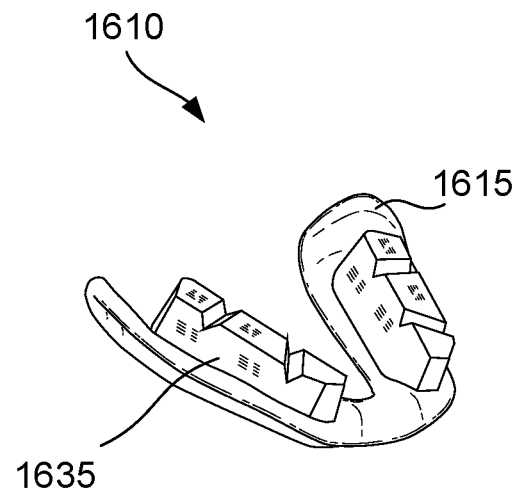
FIG. 32 is a top right perspective view of an embodiment of the mandibular tray appliance having no second contacting portion according to the embodiment of FIG. 16B.

As shown in FIG. 31, in some embodiments, the maxillary tray appliance (110) may not include a contacting portion. For example, this configuration may be used in coordination with the mandibular tray appliance (1610) which also does not include a contacting portion (see FIG. 32). In use, the maxillary tray appliance (110) as shown in FIG. 31 may be used in coordination with bite registration material having higher viscosity than light body silicone impression material, such as medium base or heavy base silicone bite registration material, alu-wax, and the like. The clinician may guide the patient (3505) into a centric relation position, and vertical dimension may be determined using, for example, a vertical dimension of rest-vertical dimension of occlusion (VDR-VDO) method.

In the field of dentistry, impression materials are classified into light body, medium body, and heavy body types.

Figure 22:
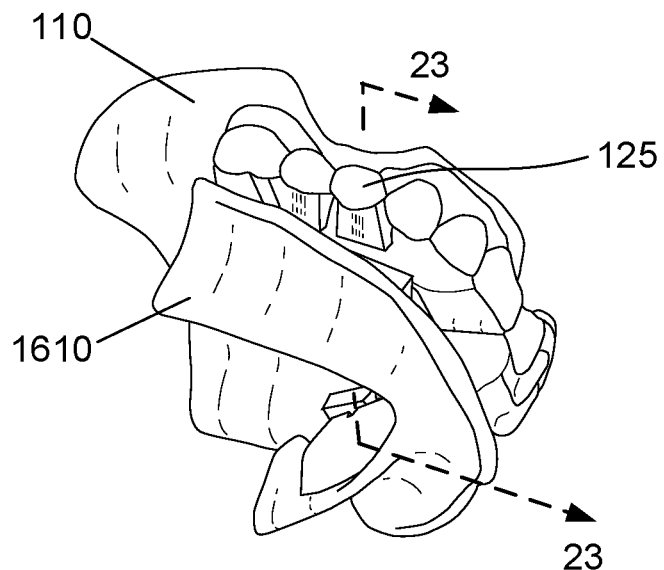
FIG. 22 is a bottom side perspective view of the tray appliance system of FIG. 20.
Figure 23:
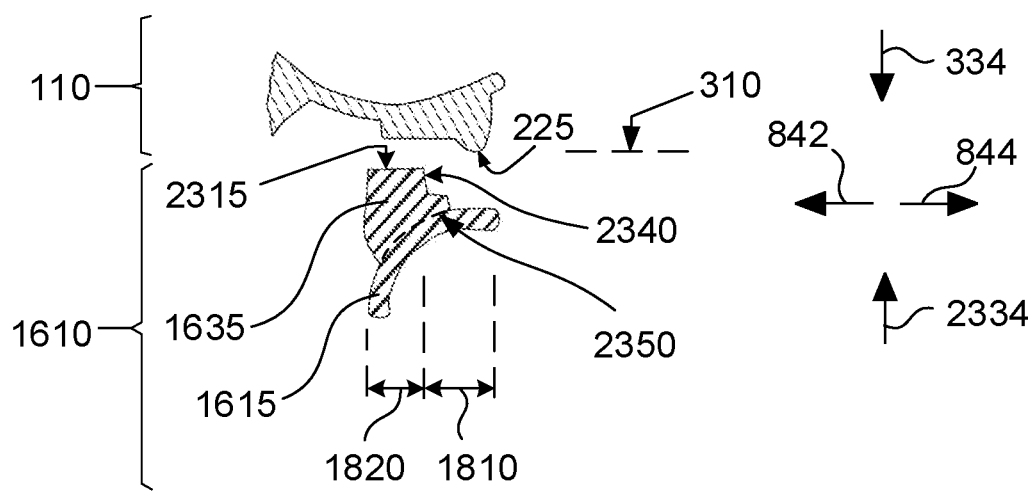
FIG. 23 is a cross-sectional view through section 23-23 of FIG. 22.
Figure 24:
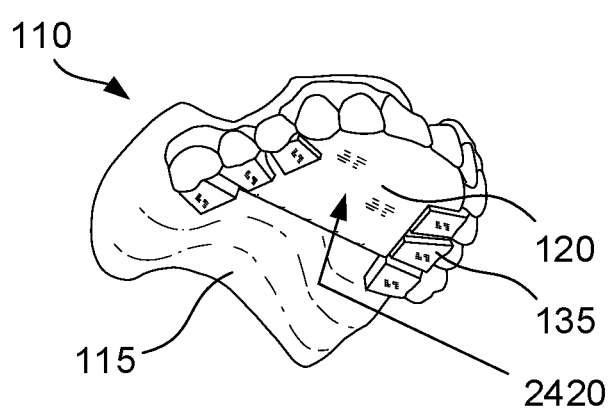
FIG. 24 is a bottom right perspective view of an embodiment of the maxillary tray appliance having plate type first contacting portion according to the embodiment of FIG. 1.
Figure 25:
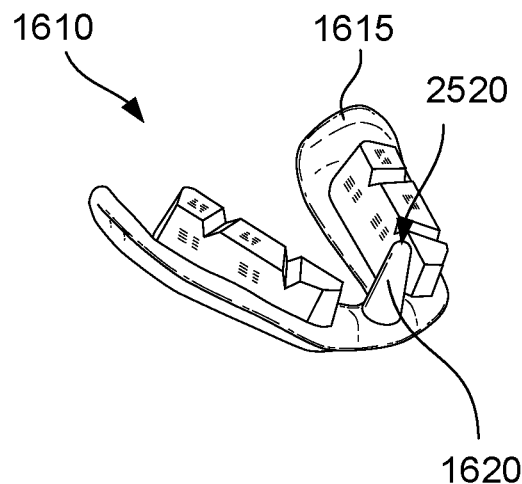
FIG. 25 is a top right perspective view of an embodiment of the mandibular tray appliance having pin type second contacting portion according to the embodiment of FIG. 16B.

FIG. 23 illustrates a cross sectional view through section line 23-23 of FIG. 22. Specifically, section line 23-23 is a cross section through the first premolar cusp tip (225) parallel to the premolar bucco-lingual axis (620). In FIG. 23, the maxillary incisal direction (334) is illustrated for the incisal direction for the maxillary tray appliance (110), and a mandibular incisal direction (2334) is illustrated for the incisal direction for the mandibular tray appliance (1610).

In FIG. 23, a second base portion boundary (2350) is marked with a dashed line. Since the mandibular tray appliance (1610) is shown in a unitary piece formation, the second base portion boundary (2350) is hypothetical because in some embodiments, it may not be a physical separation, but rather a designation to show what the portion would look like separated from its integration in the mandibular tray appliance (1610). The second base portion (1615) is preferably 0.5 millimeters to 5 millimeters in thickness.

As described previously, the mandibular tray appliance (1610) may include the second bite material accepting portion (1635), extending upwardly from the second base portion (1615). The second bite material accepting portion (1635) includes a second top surface (2315). As shown in FIG. 23, in some embodiments, the second top surface (2315) may be substantially flat, such that the bite registration material to be applied to the second top surface (2315) is prevented from developing voids, prevented from dislodgement and/or is not too thin and/or not too thick. In some embodiments, the second top surface (2315) may be between 1 millimeter and 5 millimeters lower than the incisal plane (310) when the tray appliance system is fitted within the mouth (3515) of the patient (3505). This configuration advantageously serves to provide rotational freedom, provide translational freedom, and/or prevent inaccuracies in jaw registration.

It will be understood that the second top surface (2315) is not limited to being substantially flat, and may take any suitable form, such as multiplanar, cylindrical, multilobular, and the like.

The second bite material accepting portion (1635) includes a second buccal surface (2340), defined as a surface covering a top 2 millimeters of a buccal side of the second bite material accepting portion (1635). In some embodiments, the second buccal surface (2340) may be between 2 millimeters and 10 millimeters in the lingual (842) direction to the first premolar cusp tip (225) when the tray appliance system is fitted within the mouth (3515) of the patient (3505). This configuration serves to provide rotational freedom, provide translational freedom, and/or prevent inaccuracies in jaw registration from polymerization shrinkage of the bite registration material.

Figure 20:
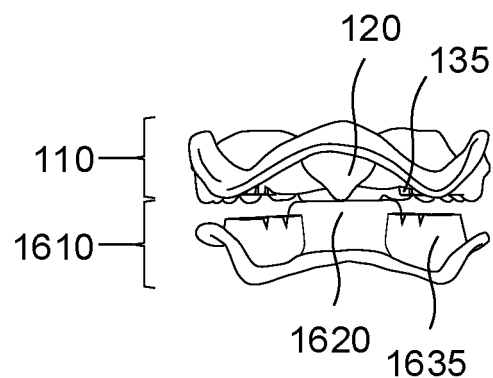
FIG. 20 is a rear perspective view of the tray appliance system including a maxillary tray appliance and a mandibular tray appliance.
Figure 21:
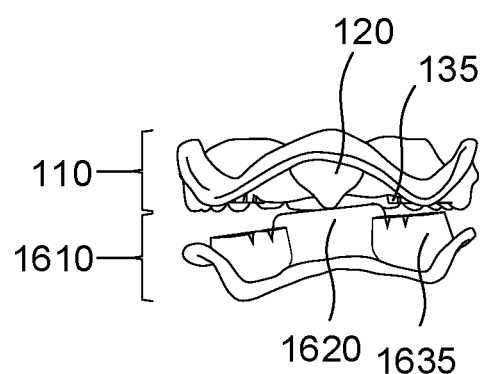
FIG. 21 is a rear perspective view of the tray appliance system of FIG. 15 showing the tray appliance system fitted to a mouth of an individual with rotational misalignment from the norm.

FIG. 20 shows the tray appliance system including the maxillary tray appliance (110) and the mandibular tray appliance (1610) in posterior view in a configuration where the maxillary tray appliance (110) and the mandibular tray appliance (1610) are ideally aligned in the mouth (3515) of a typical completely edentulous patient. FIG. 21 illustrates the tray appliance system showing rotational misalignment of the maxillary tray appliance (110) and the mandibular tray appliance (1610). This rotational misalignment may be brought about from, for example, the clinician rotationally misaligning the maxillary tray appliance (110) and/or the mandibular tray appliance in the mouth (3515) of the patient (3505). Therefore, an advantage of most embodiments is the advantage of having rotational freedom. That is, being able to be used in a variety of rotational differences from the norm (such as shown in FIG. 20 and FIG. 21). A second advantage of most embodiments is the advantage of having translational freedom (front to back and left to right). That is, being able to be used in a variety of translational differences from the norm.

Referring now to FIG. 33, in some embodiments, the first base portion (115) may optionally define a labial notch (3310) and optionally a buccal notch (3320).

The labial notch (3310) serves to provide room for impression material or border molding material to be supported by the first base portion (115) without excessively pushing on the labial frenum of the patient (3505). When the labial notch (3310) is present, the central incisor tooth form (124) may define a facial contour that does not completely follow the facial contour of the natural or artificial central incisor tooth. More specifically, in some embodiments, as shown in FIG. 33, the central incisor tooth form (124) may define a notched facial contour, such that central incisor tooth form (124) has the appearance of a central incisor, but also allows room for the labial frenum of the patient (3505). For example, in some embodiments, when fitted in the mouth, about 1 millimeter to about 5 millimeters of distance may be provided from the labial notch (3310) to the labial frenum of the patient (3505), such that impression material does not disturb the labial frenum.

The buccal notch (3320), when present, is defined by the first base portion (115), serving to provide room for the buccal frenum of the patient (3505). For example, in some embodiments, when fitted in the mouth, about 1 millimeter to about 5 millimeters of distance may be provided from the buccal notch (3320) to the buccal frenum of the patient (3505) such that impression material does not disturb the buccal frenum.

As shown in FIG. 33, the maxillary tray appliance (110) may additionally include a gum portion (3330).

Manufacturing the Maxillary Tray Appliance

In some embodiments, the maxillary tray appliance (110) may be custom manufactured to fit the edentulous maxillary gum of the patient (3505) in a computer aided design/computer aided manufacturing (CAD/CAM) process. For example, the maxillary tray appliance (110) may be fabricated by a process including the steps of: (a) providing, to a processor, a digital representation of the edentulous maxillary gum of the patient (3505), (b) providing, to a processor, a digital representation of a tooth form and a first contacting portion, (c) providing, to a processor, alignment data on the basis of at least the portion of the digital representation of the edentulous maxillary gum of the patient (3505) (d) generating, by a processor, a virtual maxillary tray appliance on the basis of the digital representation of the edentulous maxillary gum of the patient, the digital representation of the tooth form, the first contacting portion, and the alignment data (e) fabricating a maxillary tray appliance on the basis of the virtual maxillary tray appliance by a computer aided manufacturing process (such as 3D printing or milling).

In some embodiments, the maxillary tray appliance (110) may be made to fit the edentulous maxillary gum of the patient (3505) in a manual (handmade) process, using any material(s) known in the art, such as any known method(s) for making custom trays. Suitable materials include, but are not limited to, light cured materials, chemically cured materials, thermoplastic materials, and the like. For example, suitable materials include, but are not limited to polyamide, acrylonitrile butadiene styrene (ABS), polylactic acid (PLA), polyethylene terephthalate (PET), thermoplastic elastomers, polycarbonate, wood filament, biodegradable filament, polystyrene, polyvinyl alcohol, wax, acrylonitrile styrene acrylate, polypropylene, polyoxymethylene, polymethyl methacrylate, ceramics, light cured resin, self-cured resin, metals, plastics, and the like. In some embodiments, the maxillary tray appliance (110) in its entirety may be made of one material. In some embodiments, the maxillary tray appliance (110) may be made from separate materials, and not limited by spacial or temporal limitations.

In some embodiments, various features described for the maxillary tray appliance (110) and/or the mandibular tray appliance (1610) may be removably attached. For example, the first contacting portion (120), the first bite material accepting portion (135) may be removably attached to the maxillary tray appliance (110) by any suitable attachment means, such as magnetic, clip, hub, receptacle, screw, and the like. Therefore, the maxillary tray appliance (110) and/or the mandibular tray appliance (1610) may be made in a unitary piece, 2 piece, 3 piece, 4 piece fashion, and the like.

In some embodiments, additional features may be included in the maxillary tray appliance (110), such as a removable handle, removably attached to the maxillary tray appliance (110) by any suitable attachment means, such as magnetic, clip, hub, receptacle, screw, and the like.

The above-described embodiments including the drawings are examples of the invention and merely provide illustrations of the invention. Other embodiments will be obvious to those skilled in the art. Thus; the scope of the invention is determined by the appended claims and their legal equivalents rather than by the examples given.

INDUSTRIAL APPLICABILITY

The invention has application to the dental industry.

What is claimed is:

1. A tray appliance system configured to accept a bite registration material for making a dental prosthesis for a patient, the patient having a mouth defined by a maxillary jaw and a mandibular jaw, the tray appliance system comprising a maxillary tray appliance, the maxillary tray appliance comprising:

a first base portion; a first contacting portion; and a first premolar tooth form,
   the first base portion comprising:
      a first U-shaped portion being substantially U shaped in top view, and
      a first lingual portion extending upwardly with slope of at least 10 degrees from a lingual side of said first U-shaped portion;
   the first contacting portion contoured to make contact with a contacting surface originating from the mandibular jaw of the patient;
   the first premolar tooth form defining a contour with at least an incisal 2 millimeters of a facial surface of a natural or artificial premolar tooth;
   the first premolar tooth form being in a premolar tooth position when the maxillary tray appliance is fitted within the mouth of the patient,
   the first premolar tooth form having no lingual cusp so that the maxillary tray appliance is configured to enable evaluation of teeth placement while performing a jaw registration procedure;

wherein:

the maxillary tray appliance is configured to accept the bite registration material when the patient bites down to enable the dental prosthesis to be made therewith;

the maxillary tray appliance further comprising a central incisor tooth form, the central incisor tooth form defining a central incisor incisal end;

the maxillary tray appliance further comprising a contralateral first premolar tooth form;

the first premolar tooth form defining a first premolar buccal-cusp tip, and the contralateral first premolar tooth form defining a contralateral first premolar buccal-cusp tip;

the central incisor incisal end, the first premolar buccal-cusp tip, and the contralateral first premolar buccal-cusp tip define an incisal plane;

the first premolar tooth form further defining a premolar bucco-lingual axis, a premolar mesio-distal axis in bottom view, and a first premolar mesial end;

the first base portion further defining a first area for accepting the bite registration material surrounded by a first buccal boundary, a first mesial boundary, a first lingual boundary, and a first distal boundary;

the first buccal boundary being parallel to the premolar mesio-distal axis in bottom view, and being 3 millimeters lingual to the first premolar buccal-cusp tip;

the first mesial boundary being parallel to the premolar bucco-lingual axis in bottom view, and being collinear with the first premolar mesial end;

the first lingual boundary being 10 millimeters lingual to the first buccal boundary, and being parallel to the premolar mesio-distal axis;

the first distal boundary being 20 millimeters distal to the first mesial boundary, and being parallel to the premolar bucco-lingual axis;

the maxillary tray appliance further comprising a first bite material accepting portion; the first bite material accepting portion being downwardly extending from the first base portion no further than the incisal plane; and, at least a portion of the first bite material accepting portion being disposed within the first area.

2. The tray appliance system of claim 1, wherein the first bite material accepting portion extends downwardly in the direction of the incisal plane 1 millimeter to 5 millimeters to the incisal plane.

* * * * *